(12) United States Patent
Kawaji et al.

(10) Patent No.: US 6,958,589 B2
(45) Date of Patent: Oct. 25, 2005

(54) INVERTER CONTROLLER FOR DRIVING MOTOR AND AIR CONDITIONER USING INVERTER CONTROLLER

(75) Inventors: Mitsuo Kawaji, Sakata-gun (JP); Hideo Matsushiro, Kusatsu (JP); Tomohiro Sugimoto, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/814,190

(22) Filed: Apr. 1, 2004

(65) Prior Publication Data

US 2004/0232877 A1 Nov. 25, 2004

(30) Foreign Application Priority Data

| Apr. 3, 2003 | (JP) | ................................. 2003-100008 |
| Mar. 16, 2004 | (JP) | ................................. 2004-074860 |

(51) Int. Cl.[7] ............................. H02P 5/34; H02P 5/28
(52) U.S. Cl. ..................... 318/802; 318/801; 318/811; 318/729; 318/438; 318/52; 318/812
(58) Field of Search ................................. 318/801, 811, 318/729, 438, 52, 713, 812, 802

(56) References Cited

U.S. PATENT DOCUMENTS

| 4,967,135 A | * | 10/1990 | Ashikaga et al. ........... 318/808 |
| 4,992,718 A | * | 2/1991 | Kumaki ....................... 318/768 |
| 5,206,757 A | * | 4/1993 | Cheng et al. ................ 359/408 |
| 5,457,375 A | * | 10/1995 | Marcinkiewicz et al. ... 318/802 |
| 5,561,595 A | * | 10/1996 | Smith .......................... 363/37 |
| 5,723,968 A | * | 3/1998 | Sakurai ....................... 318/802 |
| 6,002,218 A | * | 12/1999 | Toda et al. .................. 318/66 |
| 6,191,545 B1 | * | 2/2001 | Kawabata et al. .......... 318/439 |
| 6,229,278 B1 | * | 5/2001 | Garces et al. ............... 318/801 |
| 6,337,548 B2 | * | 1/2002 | Kawabata et al. .......... 318/439 |
| 6,414,455 B1 | * | 7/2002 | Watson ....................... 318/432 |
| 6,489,692 B1 | * | 12/2002 | Gilbreth et al. ............. 290/52 |
| 6,512,341 B2 | * | 1/2003 | Matsushiro et al. ........ 318/254 |
| 6,768,284 B2 | * | 7/2004 | Lee et al. .................... 318/808 |
| 6,822,417 B2 | * | 11/2004 | Kawaji et al. .............. 318/701 |
| 2004/0124807 A1 | * | 7/2004 | Nakata et al. ............... 318/801 |
| 2004/0207360 A1 | * | 10/2004 | Matsushiro et al. ........ 318/811 |
| 2004/0217728 A1 | * | 11/2004 | Kawaji et al. .............. 318/801 |
| 2004/0228151 A1 | * | 11/2004 | Matsushiro et al. .......... 363/37 |
| 2004/0232876 A1 | * | 11/2004 | Matsushiro et al. ........ 318/801 |
| 2004/0246641 A1 | * | 12/2004 | Sugimoto et al. .......... 361/91.1 |
| 2005/0007061 A1 | * | 1/2005 | Hofmann et al. ........... 318/701 |

FOREIGN PATENT DOCUMENTS

| JP | 9-266674 | 10/1997 | |
| JP | 11308894 A | * 11/1999 | ............. H02P/3/18 |
| WO | WO 3081765 A1 | * 10/2003 | ........... H02P/21/00 |

OTHER PUBLICATIONS

*Inverter Drive Handbook*, compiled by Editing Committee of *Inverter Drive Handbook*, 1995, Nikkan Kogyo Shimbun, Ltd., pp 661–711.

* cited by examiner

*Primary Examiner*—Marlon T. Fletcher
*Assistant Examiner*—Patrick Miller
(74) *Attorney, Agent, or Firm*—Wenderoth, Lind & Ponack, L.L.P.

(57) ABSTRACT

A reactor having a predetermined small capacity is connected to a rectifier, and a capacitor having a predetermined small capacity is connected between DC bus lines of the inverter. A PN voltage corrector calculates a ratio of the DC voltage detection value of the inverter obtained by the PN voltage detector to a predetermined DC voltage reference value of the inverter to thereby generate a PN voltage correction factor. A beat amount corrector calculates a fluctuation amount of the motor current from the motor current detection value obtained by the motor current detector and generates a reverse phase component of the motor current fluctuation amount. Thus, a small, light and low-cost inverter controller can be implemented.

20 Claims, 23 Drawing Sheets

INVERTER CONTROLLER FOR DRIVING MOTOR AND AIR CONDITIONER USING INVERTER CONTROLLER

BACKGROUND OF THE INVENTION

1. Field of the Invention

The present invention relates to an inverter controller for driving a motor, which uses a small-capacity reactor and a small-capacity capacitor, and also relates to an air conditioner using such an inverter controller as an inverter apparatus.

2. Description of the Related Art

As a general inverter controller for driving an induction motor used in an all-purpose inverter and the like, a V/F control type of inverter controller for driving an induction motor shown in FIG. 20 is well-known as disclosed, for example, in a non-patent document 1 (see page 661 to 711 in "Inverter Drive Handbook", compiled by an editing committee of the Drive Handbook, first edition in 1995, published by THE NIKKAN KOGYO SHIMBUN, LTD, for example).

Referring to FIG. 20, a main circuit includes a DC power supply apparatus 203, an inverter 3 and an induction motor 4. The DC power supply apparatus 203 includes an AC power supply 1, a rectifier 2, a smoothing capacitor 202 storing electric energy for a DC voltage source of the inverter 3, and a reactor 201 for improving a power factor of the AC power supply 1.

Meanwhile, a control circuit includes a V/F control pattern section 7, a motor voltage command generator 8 and a PWM controller 12. The V/F control pattern section 7 is provided for deciding a motor voltage value applied to the induction motor 4 based on a speed command ω* of the induction motor 4 applied from the outside. The motor voltage command generator 8 is provided for generating a motor voltage command value of the induction motor 4 based on the motor voltage value decided by the V/F control pattern section 7. The PWM controller 12 is provided for generating a PWM signal of the inverter 3 based on the motor voltage command value generated by the motor voltage command generator 8.

FIG. 21 shows an example of the general V/F control pattern generated by the V/F control pattern section 7. As shown in FIG. 21, it is constituted such that the motor voltage value applied to the induction motor 4 is unambiguously decided in relation to the speed command ω*. In general, the speed command ω* and the motor voltage value are stored in a memory of a calculating device such as a microcomputer as table values, and the motor voltage value is provided by liner interpolation from the table values for the other speed command ω* which is not included in the table values.

Here, when the AC power supply 1 is 220 V (AC power supply frequency is 50 Hz), the input of the inverter 3 is 1.5 kW, and the smoothing capacitor 202 is 1500 μF, a relation between a harmonic component of an AC power supply current and an order to an AC power supply frequency when the reactor 201 for improving the power factor is 5 mH and 20 nH is shown in FIG. 22.

FIG. 22 shows the relation together with the IEC (International Electrotechnical Commission) standard, from which it is seen that the third harmonic component especially largely exceeds that of the IEC standard when the reactor 201 for improving the power factor is 5 mH. Meanwhile, the IEC standard is satisfied until the fortieth harmonic component in the case of 20 mH.

Thus, it is necessary to take measure to further increase an inductance value of the reactor 201 for improving the power factor in order to clear the IEC standard at the time of especially high loading, and it causes the inverter to increase in size and weight, which increases cost.

Therefore, there is proposed a DC power supply apparatus shown in FIG. 23, for example, in a patent document 1 (Japanese Patent Unexamined Laid-open Publication H9-266674). Referring to FIG. 14, a DC power supply apparatus is improved to prevent an increase of the inductance value of the reactor 201 to increase the power factor, while reducing the power supply harmonic component and increasing the power factor.

In FIG. 23, an AC power supply voltage of an AC power supply 1 is applied to an AC input terminal of a full-wave rectifier constructed by bridge connection of diodes D1 through D4, the output thereof is charged into a middle capacitor C through a reactor Lin, the charges of the middle capacitor C is discharged to a smoothing capacitor CD and a DC voltage is supplied to a load resistance RL. In this constitution, a transistor Q1 is connected in a negative and positive DC current path connecting a loading side of the reactor Lin to the middle capacitor C, and this transistor Q1 is driven by a base driving circuit G1.

In addition, pulse generation circuits I1 and I2 applying a pulse voltage to the base driving circuit G1, and a dummy resistance Rdm are further provided. Each of the pulse generation circuits I1 and I2 comprises a circuit for detecting a zero cross point of the AC power supply voltage and a pulse current circuit for applying a pulse current to the dummy resistance Rdm after the zero cross point is detected until an instantaneous value of the AC power supply voltage becomes equal to a voltage at both ends of the middle capacitor C.

Here, the pulse generation circuit I1 generates a pulse voltage in the former half of a half-cycle of the AC power supply voltage, and the pulse generation circuit I2 generates a pulse voltage in the latter half of the half-cycle of the AC power supply voltage.

In addition, when a current is forced to flow in the reactor Lin by turning the transistor Q1 on, a diode D5 for backflow prevention is connected such that the charge in the middle capacitor C may not be discharged through the transistor Q1, and a diode D6 for backflow prevention and a reactor Ldc for increasing a smoothing effect are connected in series in a path in which the charge in the middle capacitor C is discharged to the smoothing capacitor CD.

In the above constitution, the transistor Q1 is turned on at a part or a whole of a phase section in which the instantaneous value of the AC power supply voltage does not exceed the voltage at both ends of the middle capacitor C, and thus the harmonic component is reduced and a high power factor is attained without making the apparatus large.

However, in the above conventional constitution as disclosed in the patent document 1 which describes a simulation result in the case of 1500 μF and 6.2 mH, the smoothing capacitor CD and the reactor Lin having large capacity are still provided, and the middle capacitor C, the transistor Q1, the base driving circuit G1, the pulse generation circuits I1 and I2, the dummy resistance Rdm, the diodes D5 and D6 for backflow prevention, and the rector Ldc enhancing the smoothing effect are further provided. Therefore, the apparatus becomes large in size and its cost is increased because the number of parts is increased.

SUMMARY OF THE INVENTION

The present invention has been made to solve the above conventional problems and has an essential object to provide an inverter controller for driving a motor, attaining smaller size, lighter weight and lower-cost by reducing a fluctuation amount of a motor current.

In order to achieve the object, the present invention provides an inverter controller for driving a motor, which includes: an AC power supply for supplying an AC power; a rectifier formed of a diode bridge for rectifying the AC power to be converted to DC power; a reactor having a predetermined small capacity which is connected to the rectifier, for improving a power factor of the AC power supply; an inverter which converts the DC power to AC power for driving the motor; and a capacitor having a predetermined small capacity which is connected between DC bus lines of the inverter (3) to absorb regeneration energy from the motor.

The inverter controller further includes: a motor voltage command generator which generates a motor voltage command value of the motor, based on a speed command value of the motor applied from the outside; a positive neutral (PN) voltage detector which detects a DC voltage value of the inverter; a PN voltage corrector which calculates a ratio of the DC voltage detection value of the inverter obtained by the PN voltage detector to a predetermined DC voltage reference value of the inverter to thereby generate a PN voltage correction factor; a first motor voltage command corrector which performs voltage correction of the motor voltage command value by multiplying the motor voltage command value obtained by the motor voltage command generator by a PN voltage correction factor which is an output value of the PN voltage corrector to thereby produce a motor voltage command correction value; a motor current detector which detects a motor current of the motor; a beat amount corrector which calculates a fluctuation amount of the motor current from the motor current detection value obtained by the motor current detector and generates a reverse phase component of the motor current fluctuation amount, and a second motor voltage command corrector which performs voltage correction of the motor voltage command correction value by multiplying the motor voltage command correction value obtained by the first motor voltage command corrector, by an output value of the beat amount corrector, and generates a voltage command value to be applied to the motor.

According to this constitution, a small, light and low-cost inverter controller for driving the motor can be implemented by using the small-capacity reactor and the small-capacity capacitor. As a result, even when it is difficult or impossible to drive the motor because the inverter DC voltage largely fluctuates, the motor can be kept driving by keeping the voltage applied to the motor constant by the PN voltage correcting means. The small, light and low-cost inverter controller for driving the motor can be further provided by suppressing the fluctuation amount of the motor current by the beat amount correcting means to reduce loss and current capacity of the element.

In this arrangement, the beat amount corrector preferably calculates the motor current fluctuation amount ($\Delta i_j$) by calculating an average ($i_{j\_mean}$) of the motor current detection values.

According to this constitution, since the motor current fluctuation amount is provided by a simple calculation, a large increase in calculation amount in the calculating means such as a microcomputer or memory can be prevented, and the calculating means of the same cost can be provided.

Preferably, the beat amount corrector calculates the average value of the motor current detection values every cycle of an inverter operation frequency ($f_1$), and in a period of calculating the average value of the motor current detection values, the average value of the motor current detection values in a period up to at least one cycle before is set as the motor current fluctuation amount ($\Delta i_j$), and when the period of calculating the average values of the motor current detection values is finished, the motor current fluctuation amount is updated.

According to this constitution, since the average value of the motor current detection values is provided every cycle of the inverter operation frequency, the calculation amount in the calculating means such as a microcomputer and memory can be reduced and the cost of the calculating means can be reduced.

Still preferably, the beat amount corrector calculates a positive to negative ratio of the motor current detection value and obtains the motor current fluctuation amount by calculating the average of the positive to negative ratios.

According to this constitution, the calculation amount in the calculating means such as a microcomputer and memory can be reduced and the cost of the calculating means can be reduced as compared with the case in which the motor current detection values are averaged as it is.

Still further preferably, the beat amount corrector calculates the average value of the positive to negative ratios every cycle of the inverter operation frequency, and in a period of calculating the average value of the positive to negative ratios, the average value of the positive to negative ratios in a period up to at least one cycle before is set as the motor current fluctuation amount, and when the period of calculating the average values of the positive to negative ratios is finished, the motor current fluctuation amount is updated.

According to this constitution, since the average value of the positive to negative ratios is provided every cycle of the inverter operation frequency, calculation amount in the calculating means such as a microcomputer and memory can be further reduced and the cost of the calculating means can be reduced as compared with the case in which the average value of the motor current detection values is provided every cycle of the inverter operation frequency.

Still further preferably, the beat amount corrector calculates the motor current fluctuation amount by a first-order delay calculation of the motor current detection value.

According to this constitution, the calculation amount in the calculating means such as a microcomputer and memory can be further reduced and the cost of the calculating means can be reduced as compared with the case in which the motor current detection values are averaged.

Still further preferably, the beat amount corrector suppresses the motor current fluctuation amount only when the inverter operation frequency is larger than a cutoff frequency in the first-order delay calculation.

According to this constitution, the unstable phenomenon such as hunting of the motor current of the motor can be avoided.

Still further, the beat amount corrector includes a delay time compensating means for compensating a time delay accompanied by the first-order delay calculation.

According to this constitution, the suppressing effect of the motor current fluctuation amount can be improved because the delay time accompanied by the first-order delay calculation is compensated.

Still further preferably, the beat amount corrector includes a fundamental wave current detector which detects a fundamental wave component of a motor current from the motor current detection value and calculates the motor current fluctuation amount from a difference between the motor current detection value and an output value of the fundamental wave current detector.

According to this constitution, the calculation amount in the calculating means such as a microcomputer and memory can be further reduced and the cost of the calculating means can be reduced as compared with the case in which the first-order delay calculation is performed for the motor current detection value.

Still further preferably, the fundamental wave current detector converts the motor current detection value from the three-phase AC to the two-phase DC, performs the first-order delay calculation thereof, and further converts the resultant value from the two-phase DC to the three-phase AC, thereby obtaining the motor current fundamental wave component.

According to this constitution, since the motor current detection value is converted from the three-phase AC to the two-phase DC and then the first-order delay calculation is performed, the motor current fluctuation amount can be provided at real time without the time delay, so that the suppressing effect of the motor current fluctuation amount can be improved.

Still further preferably, the motor current fluctuation amount is suppressed only when the motor current fluctuation amount is larger than a predetermined set value of the motor current fluctuation amount.

According to this constitution, since the motor current fluctuation amount is suppressed only when the motor current fluctuation amount is more than the predetermined set value of the motor current fluctuation amount, the motor current fluctuation amount can be effectively suppressed, the calculation amount in the calculating means such as a microcomputer and memory can be reduced and the cost of the calculating means can be reduced.

Still further preferably, the motor current fluctuation amount is suppressed only when the inverter operation frequency is larger than a predetermined inverter operation frequency set value.

According to this constitution, since the motor current fluctuation amount is suppressed only when the inverter operation frequency is more than the predetermined inverter operation frequency set value, the motor current fluctuation amount can be effectively suppressed, the calculation amount in the calculating means such as a microcomputer and memory can be reduced and the cost of the calculating means can be reduced.

Still further preferably, the motor current fluctuation amount is not suppressed in a transient condition in which the motor is accelerated or decelerated.

According to this constitution, since the motor current fluctuation amount is not suppressed in the transient condition in which the motor is accelerated or decelerated, the unstable phenomenon such as hunting of the motor current of the motor can be avoided, the calculation amount in the calculating means such as a microcomputer and memory can be further reduced and the cost of the calculating means can be reduced.

Still further preferably, the motor current detector includes a current detector which detects a current flowing in a DC bus line of the inverter so that the motor current is detected from an output value of the current detector. Preferably, the shunt resistance previously provided in the DC bus line of the inverter for protecting an overcurrent of the inverter serves as the current detector. Preferably, the motor current detector detects the motor current in synchronization with a carrier frequency of the inverter.

According to this constitution, the cost of the motor current detecting means can be a requisite minimum as compared with the case in which a current sensor is used.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DETAILED DESCRIPTION OF THE PREFERRED EMBODIMENTS

Embodiments of the present invention are described hereinafter with reference to the drawings. It is to be noted here that, although the following description is made referring to an inverter controller for driving an induction motor, the present invention is not limited to this and can be applied to an inverter controller for driving any type of motor.

Embodiment 1

Figure 1:
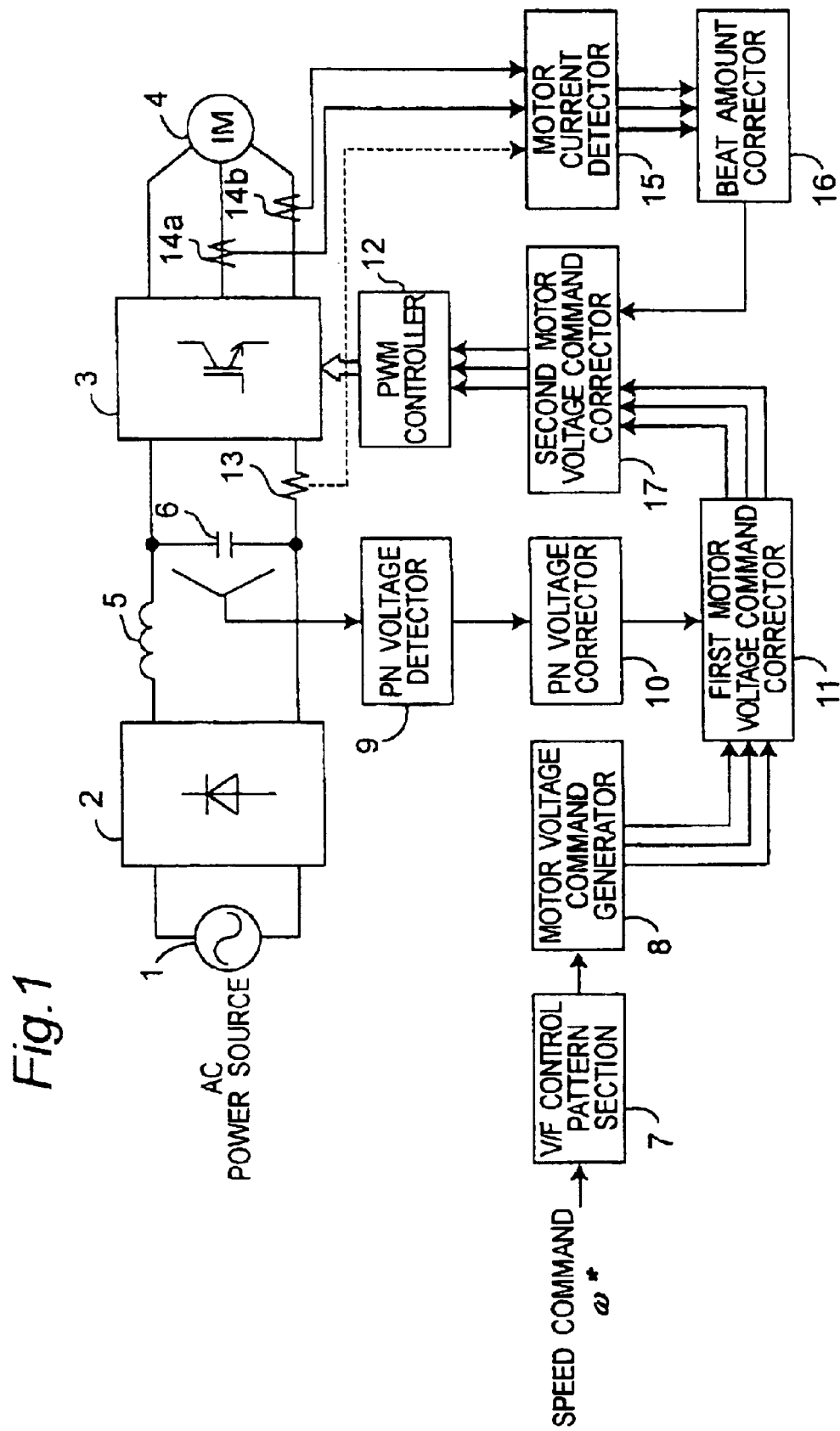
FIG. 1 is a block diagram showing a system constitution of an inverter controller for driving an induction motor according to a first embodiment of the present invention.

FIG. 1 shows a system constitution of an inverter controller for driving an induction motor according to a first embodiment of the present invention. Referring to FIG. 1, a main circuit of the system constitution includes an AC power supply 1, a rectifier 2 formed of a diode bridge for converting AC power to DC power, a small-capacity reactor 5, a small-capacity capacitor 6, an inverter 3 for converting the DC power to AC power, and an induction motor 4 driven by the AC power converted by the inverter 3.

Meanwhile, a system control circuit includes a V/F control pattern section 7, a motor voltage command generator 8, a PN voltage detector 9, a PN voltage corrector 10, a first motor voltage command corrector 11, a PWM controller 12, an inverter bus line current sensor 13, motor current sensors 14a and 14b, a motor current detector 15, a beat amount corrector 16, and a second motor voltage command corrector 17.

The V/F control pattern section 7 generates a V/F control pattern based on a speed command ω* of the induction motor 4 applied from the outside, determining a motor voltage value to be applied to the induction motor 4. The motor voltage command generator 8 generates a motor voltage command value of the induction motor 4 based on the motor voltage value decided by the V/F control pattern section 7. The PN voltage detector 9 detects a DC voltage value of the inverter 3. The PN voltage corrector 10 provides a ratio of the DC voltage detection value of the inverter 3 obtained by the PN voltage detector 9 to a predetermined DC current voltage reference value of the inverter 3. The first motor voltage command corrector 11 performs voltage correction of the motor voltage command value by multiplying the motor voltage command value obtained by the motor voltage command generator 8 by a PN voltage correction factor which is an output value of the PN voltage corrector 10 and generates a motor voltage command correction value for the induction motor 4.

Figure 20:
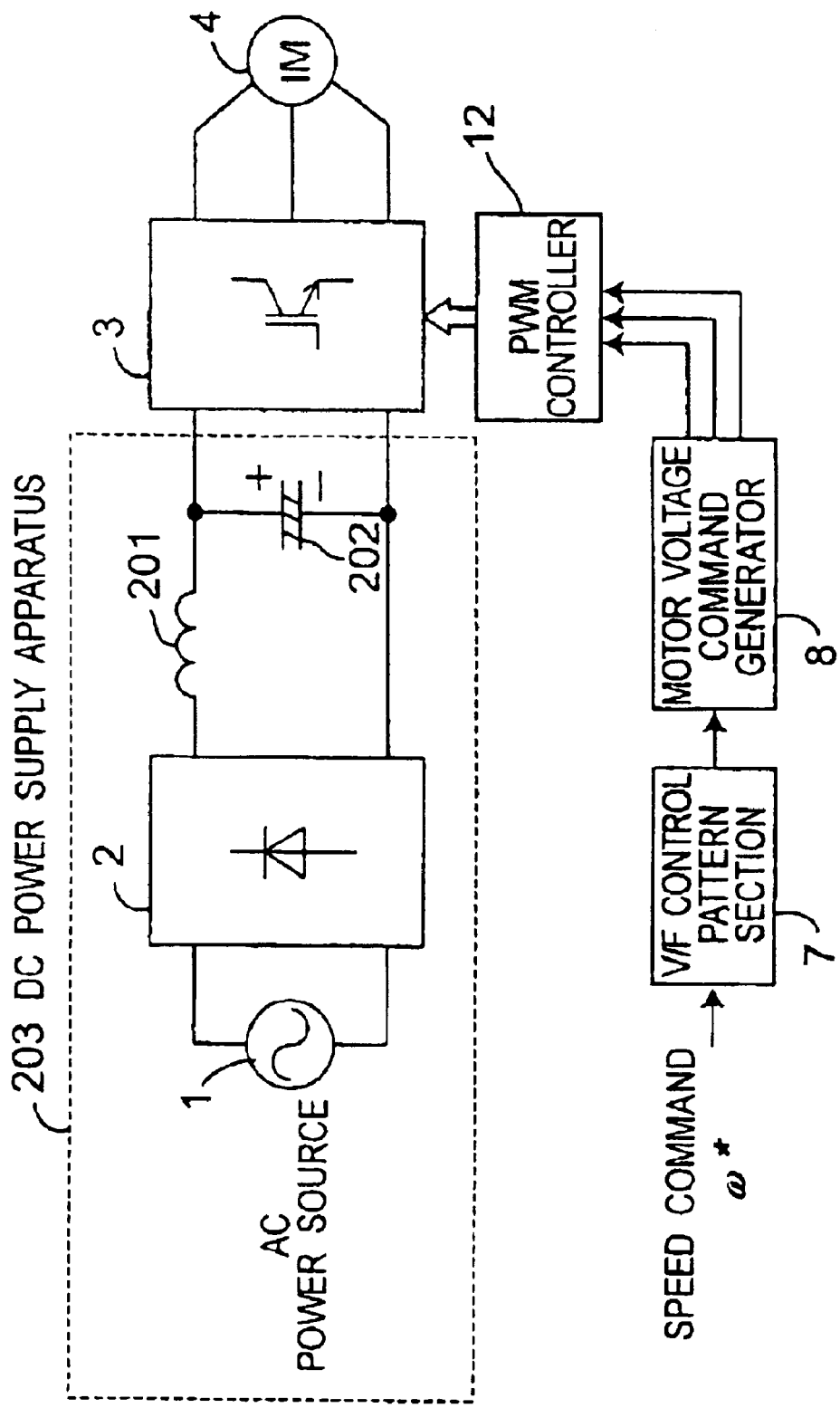
FIG. 20 is a block diagram showing a system constitution of a prior art inverter controller for driving an induction motor.
Figure 21:
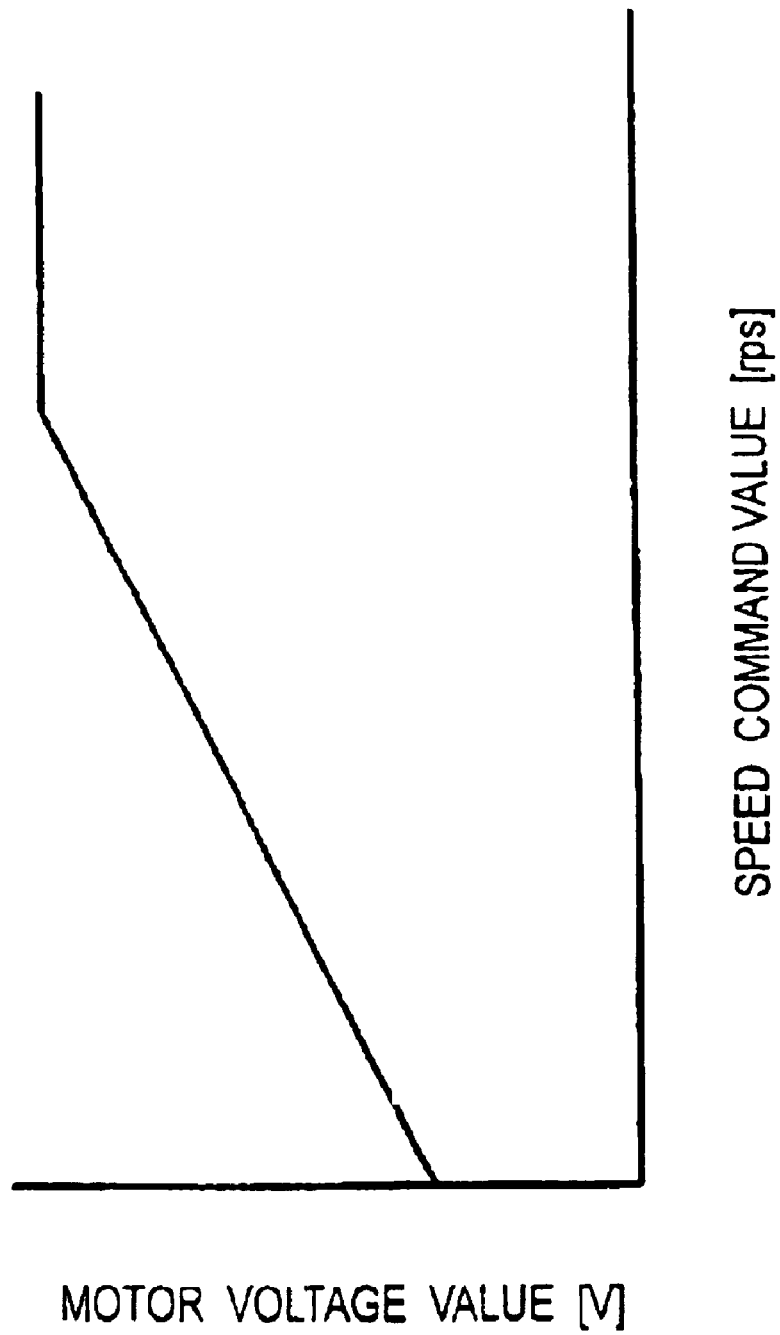
FIG. 21 is a graph view showing an example of a prior art V/F control pattern.
Figure 22:
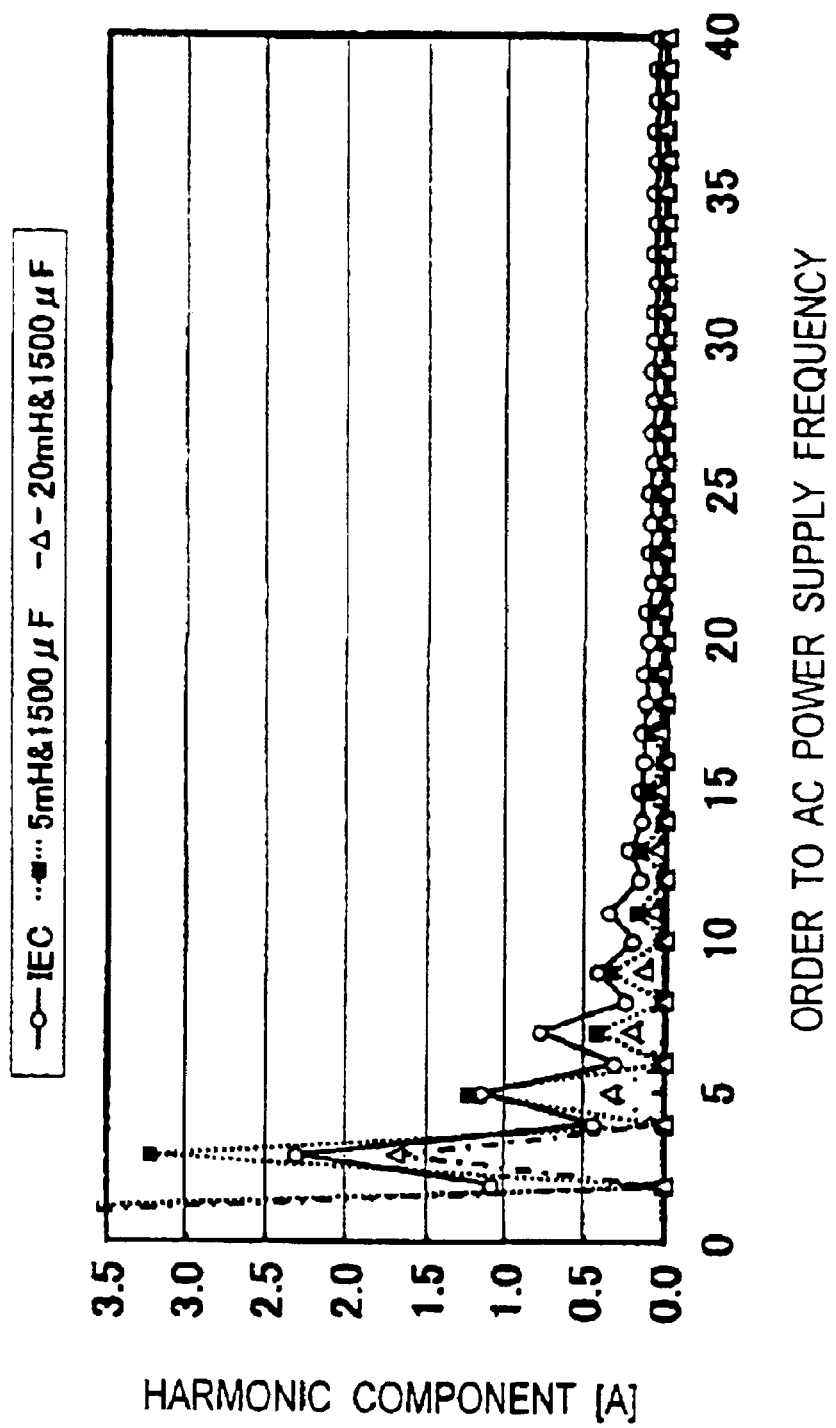
FIG. 22 is a diagrammatic view showing a relation between a harmonic component of an AC power supply current and an order to the AC power supply frequency in the prior art inverter controller shown in FIG. 20.
Figure 23:
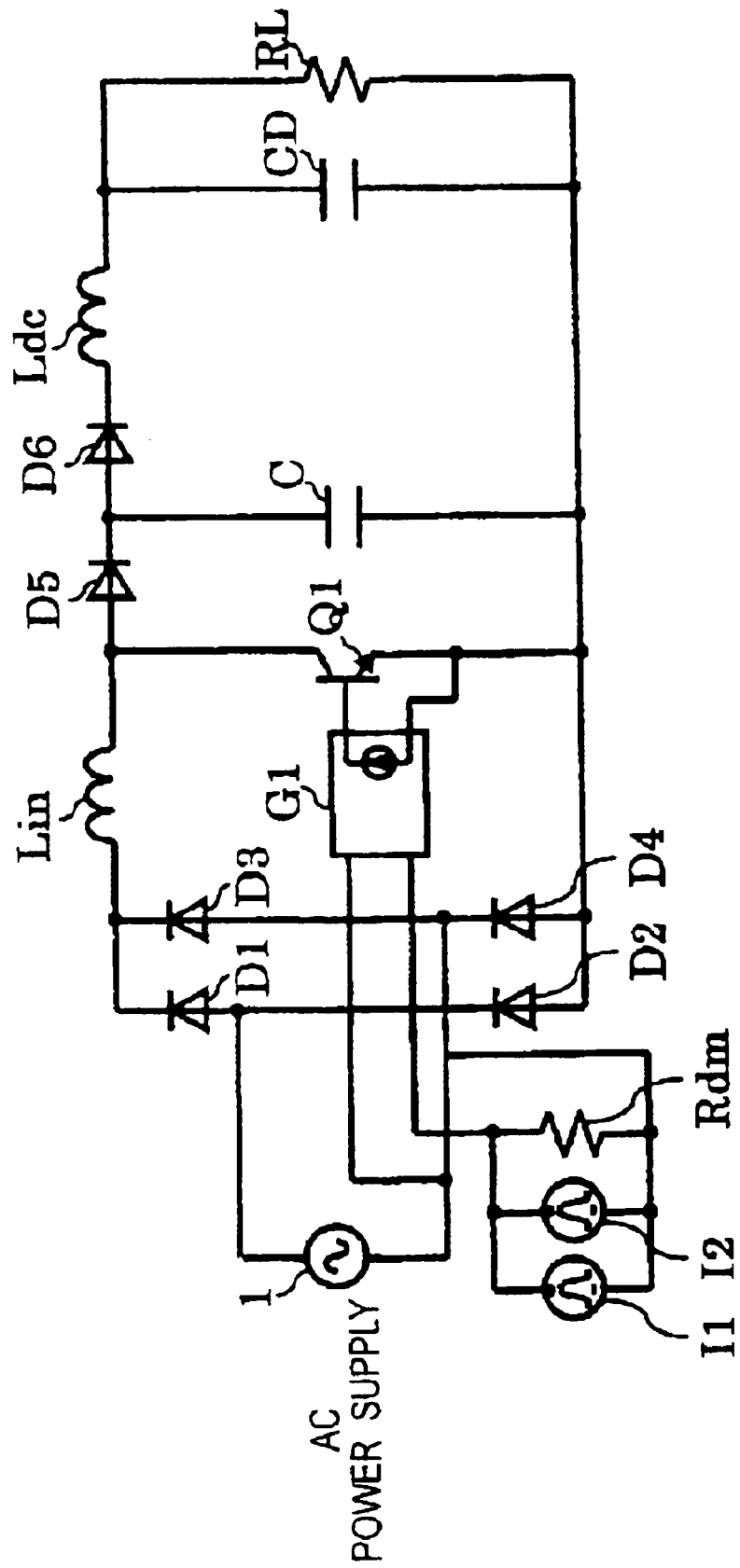
FIG. 23 is a circuit diagram showing a prior art DC power supply apparatus.

The motor current detector 15 detects a motor current through the inverter bus line current detector sensor 13 or the motor current detectors 14a and 14b. The beat amount corrector 16 provides a reverse phase component of a fluctuation amount in motor current. The second motor voltage command corrector 17 performs voltage correction of the motor voltage command value by multiplying the motor voltage command correction value obtained by the first motor voltage command corrector 11 by an output value of the beat amount corrector 16 and generates a motor voltage command value applied to the induction motor 4. The PWM controller 12 generates a PWM signal to be applied to the inverter 3 based on the motor application voltage command value generated by the second motor voltage command corrector 17. Since the V/F control pattern section 7 is described in the prior art with reference to FIG. 20, its description is omitted here.

A specific method and operation of the inverter controller for driving the induction motor will be described hereinafter.

Motor voltage command values $v_u^*$, $v_v^*$ and $v_w^*$ (hereinafter, represented by $v_j^*$, here j=u, v, w) are produced by the motor voltage command generator 8 through a calculation expressed by a formula (1)

(Formula 1)

$$\begin{cases} v_u^* = V_m \sin\theta_1 \\ v_v^* = V_m \sin(\theta_1 - 2\pi/3) \\ v_w^* = V_m \sin(\theta_1 + 2\pi/3) \end{cases} \quad (1)$$

Here, $V_m$ is a motor voltage value decided from the V/F control pattern, and θ1 is provided by time integrating the speed command ω* as expressed by a formula (2).

(Formula 2)

$$\theta_1 = \int \omega^* dt \quad (2)$$

It is noted here that, when the calculation is performed by calculating means such as a microcomputer, a discrete-time system (a sampling time of a microcomputer and the like is set to $T_s$) is employed and a present value n $T_s$ is used in each calculation hereinafter unless otherwise stated. For example, when the motor voltage command value is provided, $\theta_1$ in the formula (1) is read as $\theta_1 [nT_s]$).

Figure 2:
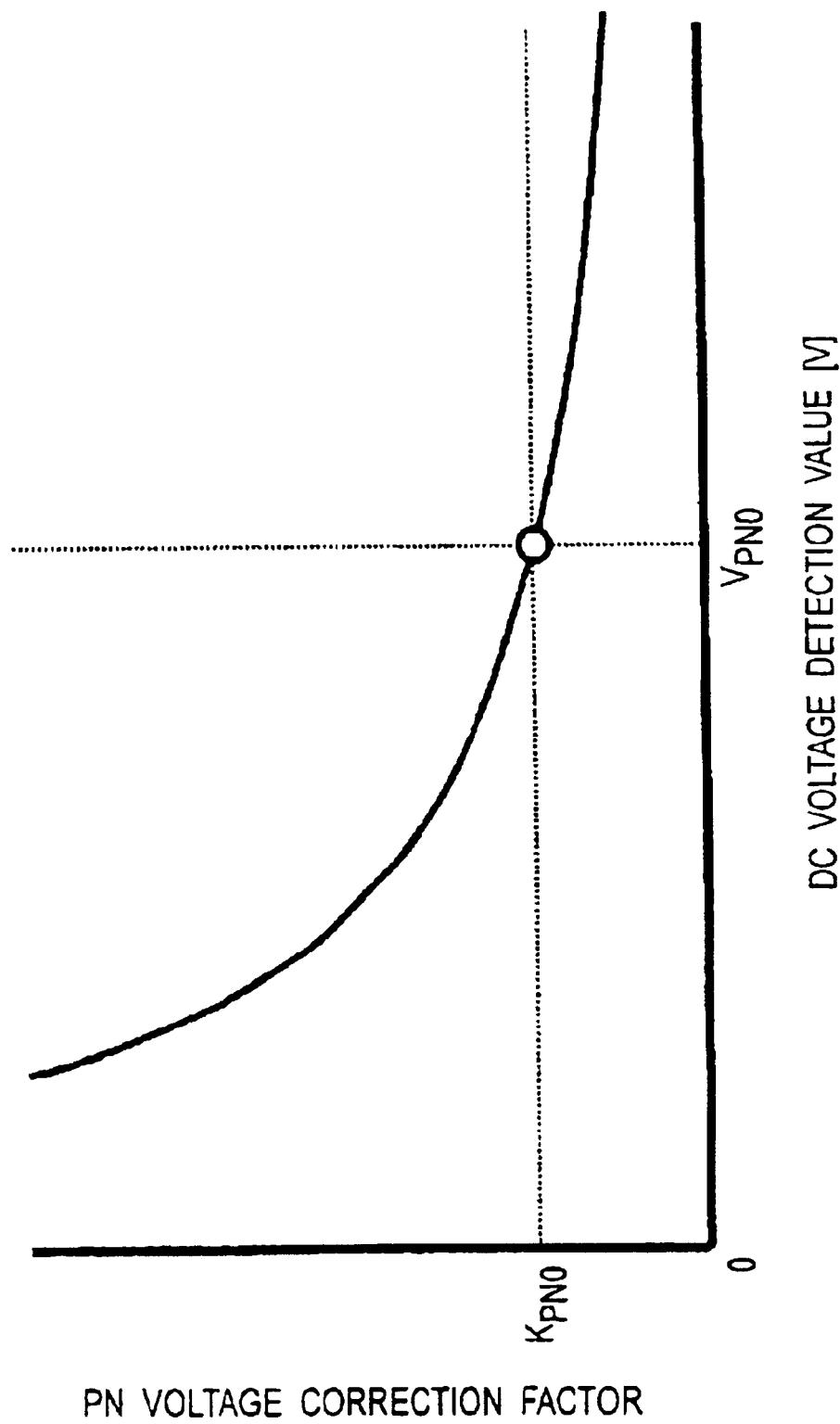
FIG. 2 is a graph view for explaining a PN voltage corrector according to the first embodiment of the present invention.

FIG. 2 shows a graph for explaining a function of the PN voltage corrector 10 according to the first embodiment of the present invention, in which a PN voltage correction factor $k_{pn}$ is provided in the PN voltage corrector 10, as expressed by a formula (3) using a predetermined DC voltage reference value $V_{pn0}$ of the inverter 3 and a DC voltage detection value $v_{pn}$ of the inverter 3 obtained by the PN voltage detector 9.

(Formula 3)

$$k_{pn} = \frac{V_{pn0}}{v_{pn} + \delta_0} \quad (3)$$

Here, since the small-capacity capacitor is used in the present invention, there is a case that the DC voltage detection value $v_{pn}$ becomes zero, so that it is necessary to set a minute term $\delta_0$ in order to prevent zero dividing.

Instead of the minute term $\delta_0$ in the formula 3, the zero dividing can be prevented by setting a predetermined maximum value of the PN voltage correction factor in the PN voltage correction factor $k_{pn}$ when the DC voltage detection value $v_{pn}$ is zero or less.

In other words, the PN voltage correction factor $k_{pn}$ may be provided as expressed by a formula (4).

(Formula 4)

$$k_{pn} = \begin{cases} k_{pn\_max} & (v_{pn} \leq 0) \\ V_{pn0}/v_{pn} & (v_{pn} > 0) \end{cases} \quad (4)$$

Here, $k_{pn\_max}$ is the predetermined maximum value of the PN voltage correction factor.

In the PN voltage corrector 10, the PN voltage correction factor $k_{pn}$ is preferably set to have at least a predetermined upper limit value or a predetermined lower limit value, the induction motor can be kept driving even when the inverter DC voltage largely fluctuates, and further the AC power supply current can be prevented from fluctuating, so that an AC power supply power factor can be improved and a harmonic component of the AC power supply current can be eliminated.

Still preferably, the PN voltage corrector 10 increases the PN voltage correction factor $k_{pn}$ in proportion to the DC voltage detection value when the DC voltage detection value is larger than the DC voltage reference value. As a result, the induction motor can be kept driving even when the inverter DC voltage largely fluctuates, and an output torque of the induction motor can be improved by increasing the PN voltage correction factor when the inverter DC voltage is larger than the DC voltage reference value.

In the first motor voltage command corrector 11, a motor voltage command correction value $v_{jh}^*$ is obtained by a formula (5) using the motor voltage command value $v_j^*$ and the PN voltage correction factor $k_{pn}$.

$$v_{jh}^* = k_{pn} \cdot v_j^* \quad (5)$$

Figure 19:
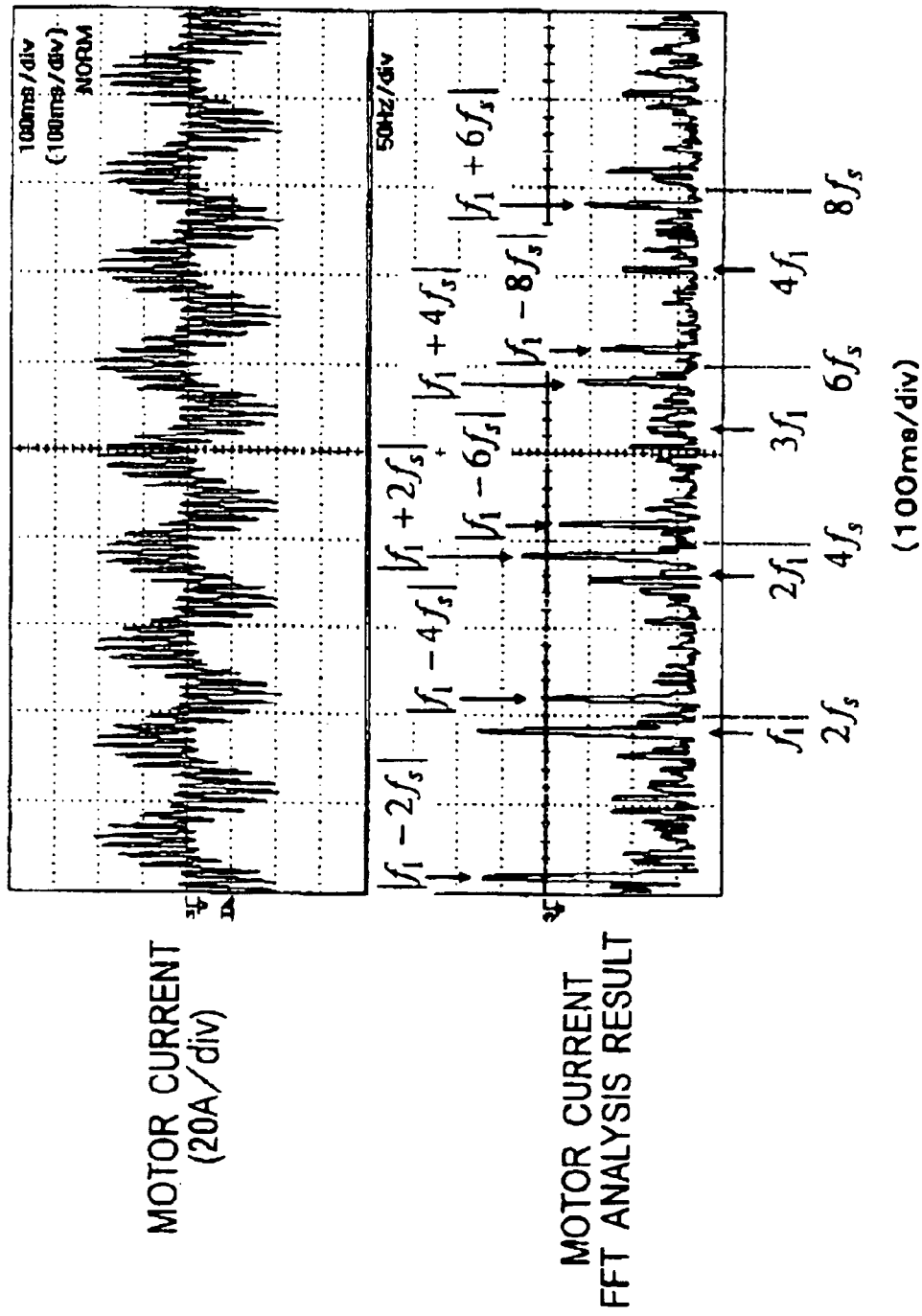
FIG. 19 is a view showing frequency analysis results of a motor current.

Here, FIG. 19 shows frequency analysis results of the motor current. Since the small-capacity capacitor is used in the present invention, the inverter current voltage largely fluctuates at a two-fold frequency of the AC power supply frequency $f_s$. Therefore, there is generated a beat phenomenon in which a fluctuation amount of the frequency component of absolute values $|f_1 \pm 2 n f_s|$ ("n" is a positive integer) of a sum and a difference between an inverter operation frequency $f_1$ and a frequency of an even-numbered multiple of a power supply frequency $f_s$ is superposed on the motor current as shown in FIG. 19. As a result, a loss is increased or the capacitor becomes large in size and the cost thereof is increased because of increase in current capacity.

In this case, the AC power supply 1 is 220 V (AC power supply frequency is 50 Hz), an inductance value of the small-capacity reactor 5 is 0.5 mH, capacity of the small-capacity capacitor 6 is 10 μF and the inverter operation frequency is 90 Hz.

Then, the fluctuation amount of the motor current is prevented by the following method.

Figure 3:
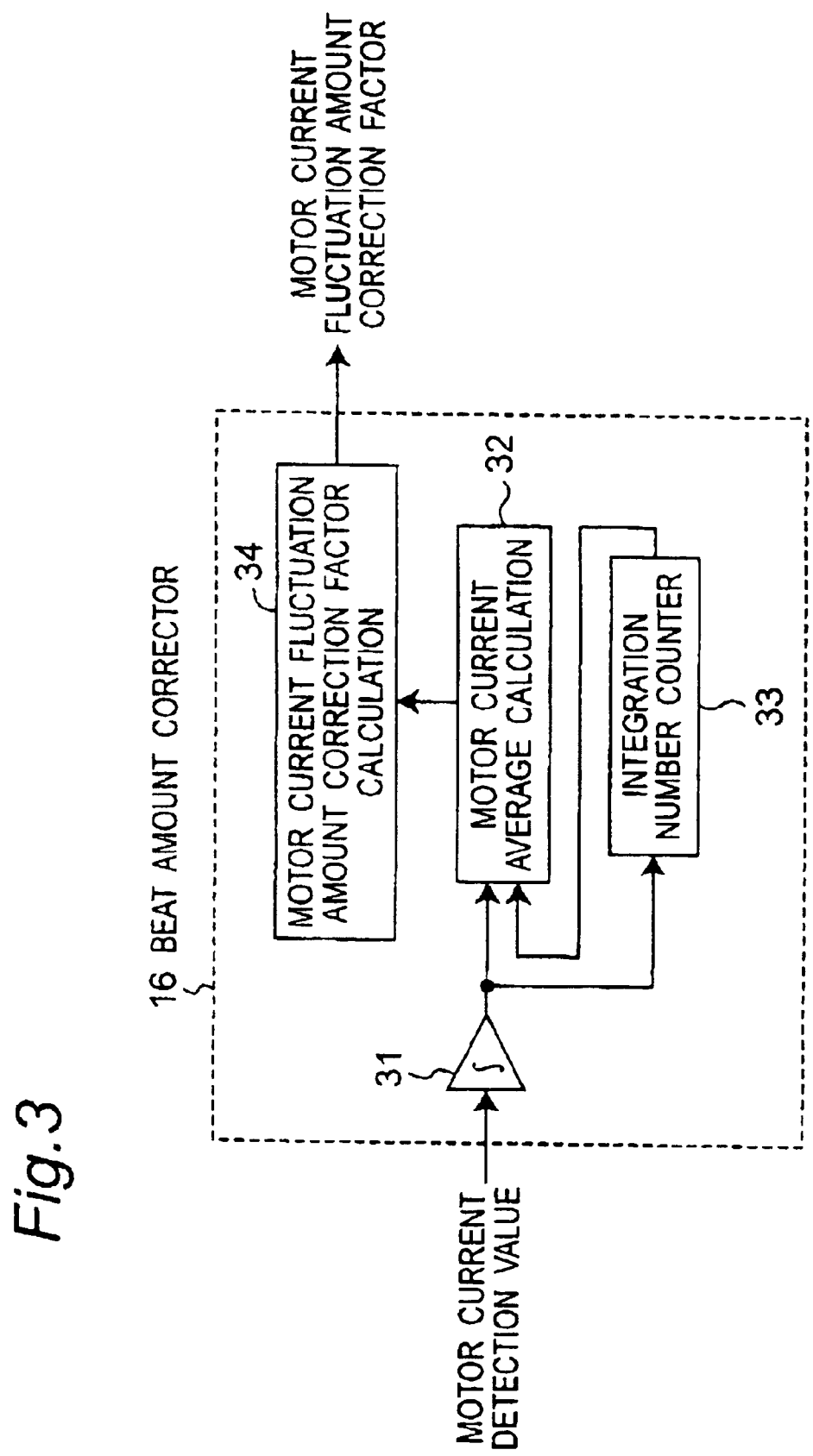
FIG. 3 is a block diagram showing a beat amount corrector according to the first embodiment of the present invention.

FIG. 3 shows the beat amount corrector 16 according to the first embodiment of the present invention, in which when the motor current detection value $i_j$ is integrated by an integrator 31, the number N of integrations of the motor current detection value $i_j$ in one cycle is stored in an integration number counter 33. A motor current average calculating portion 32 divides the output value (i.e., motor current integration value) of the integrator 31 by the integration number N stored in the integration number counter 33, so that a motor current average value $i_{j\_mean}$ is calculated, and the calculation result is applied to a motor current fluctuation amount correction factor calculating portion 34.

Here, since the motor current detection value $i_j$ in FIG. 19 can be provided by combining a fundamental wave component $i_{1j}$ and a fluctuation amount $\Delta i_j$ basically as expressed by a formula (6), it can be seen that the motor current fluctuation amount $\Delta i_j$ is obtained by an average calculation of the motor current detection value $i_j$. This is apparent because the calculated average of sine wave or cosine wave becomes zero.

(Formula 6)

$$i = i_{1j} + \Delta i_j \quad (6)$$

The motor current fundamental wave component $i_{1j}$ can be expressed by a formula (7).

(Formula 7)

$$i_{1u} = I_{1m} \sin(\theta_1 + \phi)$$

$$i_{1v} = I_{1m} \sin(\theta_1 + \phi - 2\pi/3) \quad (7)$$

$$i_{1w} = I_{1m} \sin(\theta_1 + \phi + 2\pi/3)$$

Here, $I_{1m}$ is a maximum value of the motor current fundamental wave component and $\phi$ is a power factor angle (which is a phase difference between the motor voltage and the motor current).

Thus, the motor current average value $i_{j\_mean}$ is expressed by a formula (8).

(Formula 8)

$$i_{j\_mean}[nT_S] = \frac{1}{N} \cdot \sum_{m=n-N+1}^{n} i_j[mT_S] \quad (8)$$

That is, according to the formula (8), a present value $i_{j\_mean}[nT_s]$ of the motor current average value is obtained by integrating the motor current detection values from the value $i_j[(n-N+1)T_s]$ which is provided (N−1) times before, to the present value $i_j[nT_s]$ and dividing the integrated value by the integration number N.

Referring back to FIG. 3, the motor current fluctuation amount correction factor calculating portion 34 calculates a reverse phase component of the motor current average value $i_{j\_mean}$ so that a beat amount correction factor $k_{bj}$ of each phase is generated by a formula (9).

(Formula 9)

$$k_{bj} = 1 - \frac{i_{j\_mean}}{I_R} \cdot K_B \quad (9)$$

Here, $I_R$ is a predetermined motor current reference value and $K_B$ is a control gain.

Figure 9:
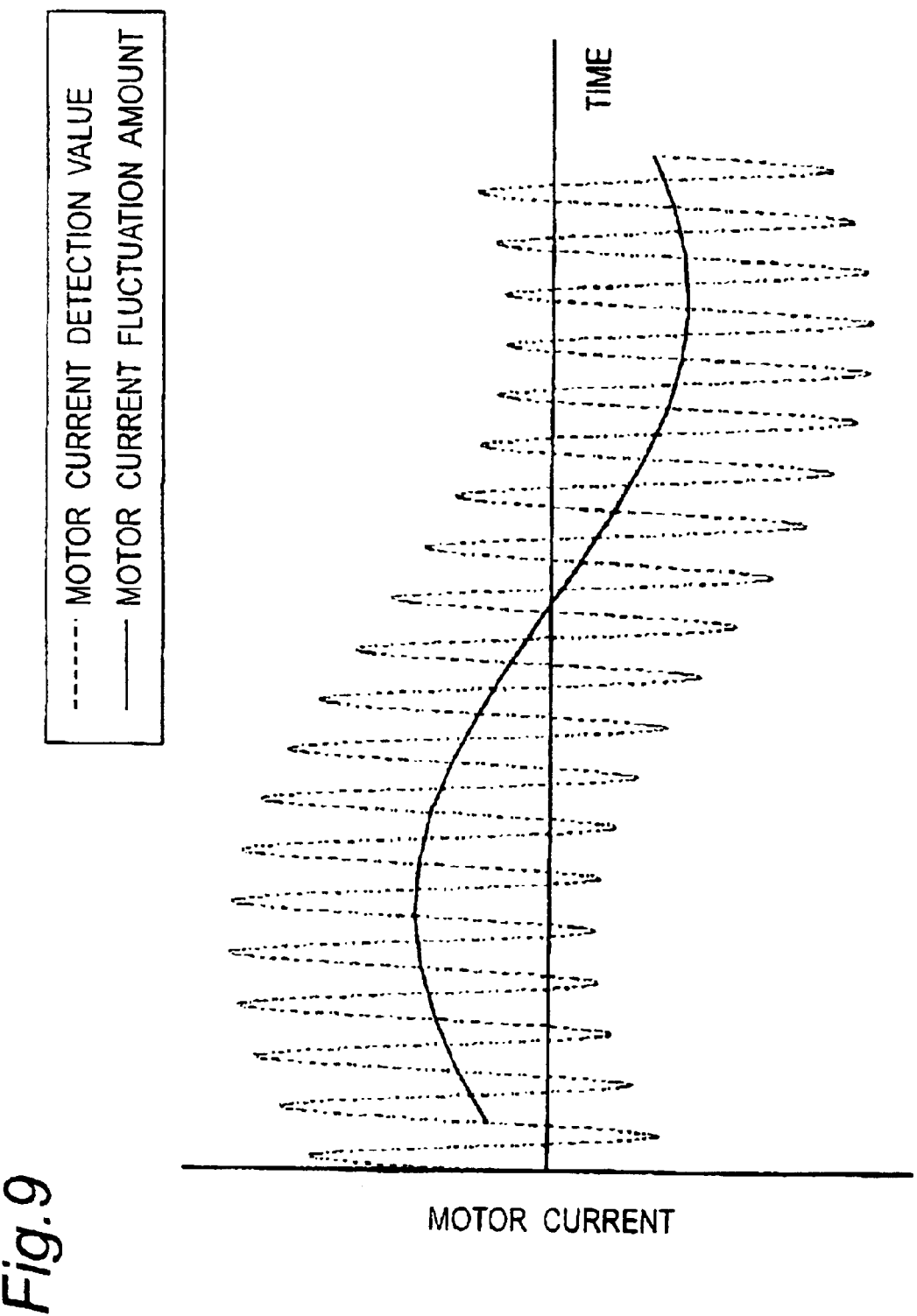
FIG. 9 is an explanatory view showing an operation of the beat amount corrector shown in FIG. 3.

FIG. 9 shows a relation between the motor current detection value $i_j$ and the motor current fluctuation amount $\Delta i_j$ in the beat amount corrector 16 shown in FIG. 3. In the drawing, it can be seen that the motor current fluctuation amount $\Delta i_j$ is obtained by calculating the motor current average value $i_{j\_mean}$ from the motor current detection values $i_j$ by the formula (8).

As described above, since the motor current fluctuation value can be obtained by a simple calculation, a calculation amount in a calculating means such as a microcomputer or memories can be prevented from being largely increased and the cost of the calculating means can be saved.

Referring back to FIG. 1, the second motor voltage command corrector 17 generates a voltage command value $v_{jh2}^*$ to be applied as expressed by a formula (10) using the motor voltage command correction value $v_{jh}^*$ and the beat amount correction factor $k_{bj}$.

(Formula 10)

$$v_{jh2}^* = k_{bj} \cdot v_{jh}^* \quad (10)$$

In addition, according to the inverter controller for driving the induction motor of the present invention, the inverter operation frequency is prevented from being constantly fixed at a resonant frequency in which the inverter operation frequency becomes the even-numbered multiple of the AC power supply frequency and in a range having a predetermined frequency width around the resonant frequency. As a result, an unstable operation of the induction motor can be prevented, and a stable driving can be implemented.

Still further, according to the inverter controller for driving the induction motor of the present invention, the combination of the small-capacity reactor and the small-capacity capacitor is preferably decided so that the resonant frequency between the small-capacity reactor and the small-capacity capacitor may be larger than forty-fold of the AC power supply frequency. Thus, the harmonic component of the AC power supply current can be prevented and the IEC standard can be satisfied.

Still further, according to the inverter controller for driving the induction motor of the present invention, the capacity of the small-capacity capacitor is preferably decided so that the maximum value of the DC voltage value which increases when the inverter stops may be smaller than a withstand voltage of the capacitor element. Thus, the peripheral circuits can be prevented from being destroyed.

Still further, according to the inverter controller for driving the induction motor of the present invention, the carrier frequency of the inverter is preferably decided so as to satisfy a predetermined AC power supply power factor value. Thus, an inverter loss can be suppressed so as to be the requisite minimum by setting the carrier frequency at the requisite minimum by using carrier frequency dependency of the small-capacity reactor.

As described above, in the inverter controller according to the present embodiment, since each of the phase voltage command values is corrected using the PN voltage correction factor, almost constant motor voltage can be applied even when the PN voltage fluctuates. Thus, a large-capacity capacitor becomes unnecessary and therefore a small-capacity capacitor can be used. By using such a small-capacity capacitor, the input current can always be applied to the motor and the power factor of the input current can be increased, so that the reactor can be reduced in size. Thus, by using the small-capacity reactor and the small-capacity capacitor, there can be attained a small, light and low-cost inverter controller for driving an induction motor. As a result, even when it is difficult or impossible to drive the induction motor because the inverter DC voltage largely fluctuates, the induction motor can be kept driving by operating the inverter so that the voltage applied to the induction motor remains almost constant.

In addition, the fluctuation amount of the motor current can be suppressed by the beat amount corrector 16, and a loss and current capacity of the element can be reduced. Accordingly, there can be achieved a further smaller, lighter and lower-cost inverter controller.

In addition, it is noted here that the present invention is not limited to the inverter controller for driving the induction motor by the V/F control as described in the above embodiment, but can be applied to an inverter controller for driving an induction motor by a well-known vector control method.

Furthermore, the present invention can be applied to either a compressor drive motor in an air conditioner in which a speed sensor such as a pulse generator and the like cannot be used, or a servo drive in which a speed sensor can be provided.

Embodiment 2

Figure 4:
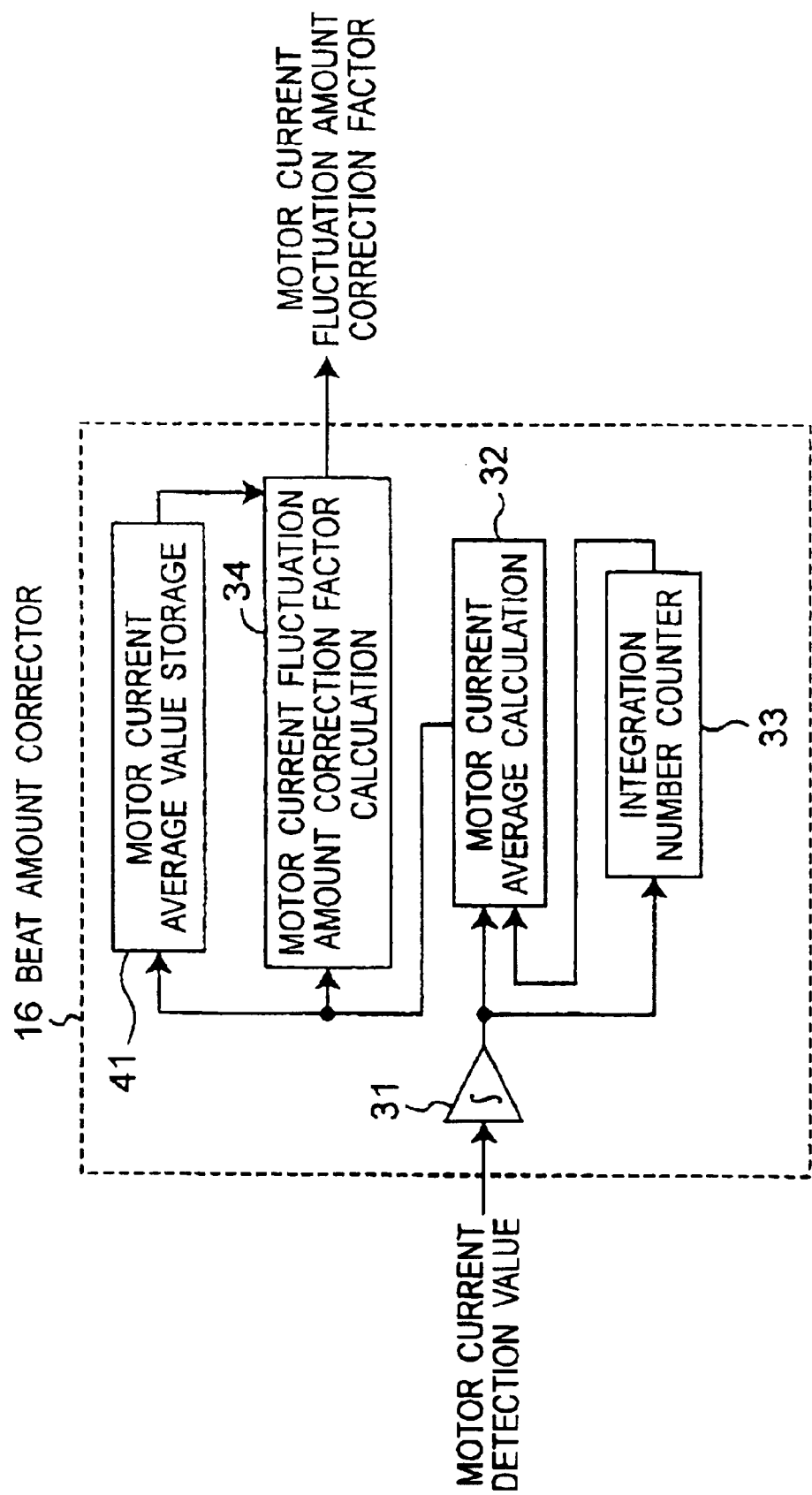
FIG. 4 is a block diagram showing a beat amount corrector according to a second embodiment of the present invention.

FIG. 4 shows a block construction of a beat amount corrector 16 according to a second embodiment of the present invention. The same components as in the beat amount corrector shown in FIG. 3 are allotted to the same reference signs and their descriptions are omitted here, and only different parts are described hereinafter.

Referring to FIG. 4, a motor current average calculating portion 32 calculates a motor current average value $i_{j\_mean}$ every cycle of an inverter operation frequency $f_1$, and a motor current average value storing portion 41 stores the motor current average values $i_{j\_mean}$ previously provided by the motor current average calculating portion 32 in M cycles before the present calculation. In a period of calculating the motor current average value $i_{j\_mean}$, the motor current average value $i_{j\_mean}$ in a period of at least M-1 cycles previous to the present calculation is set as the motor current fluctuation amount $\Delta i_j$, and when the period of calculating the motor current average values $i_{j\_mean}$ is finished, the motor current fluctuation amount $\Delta i_j$ is updated.

In this constitution, regarding the number M of the cycles when storing the motor current average values $i_{j\_mean}$ in the motor current average value storing portion 41, it has been previously set depending on the inverter operation frequency $f_1$ or the loading condition in view of a delay time and response ability.

Figure 10:
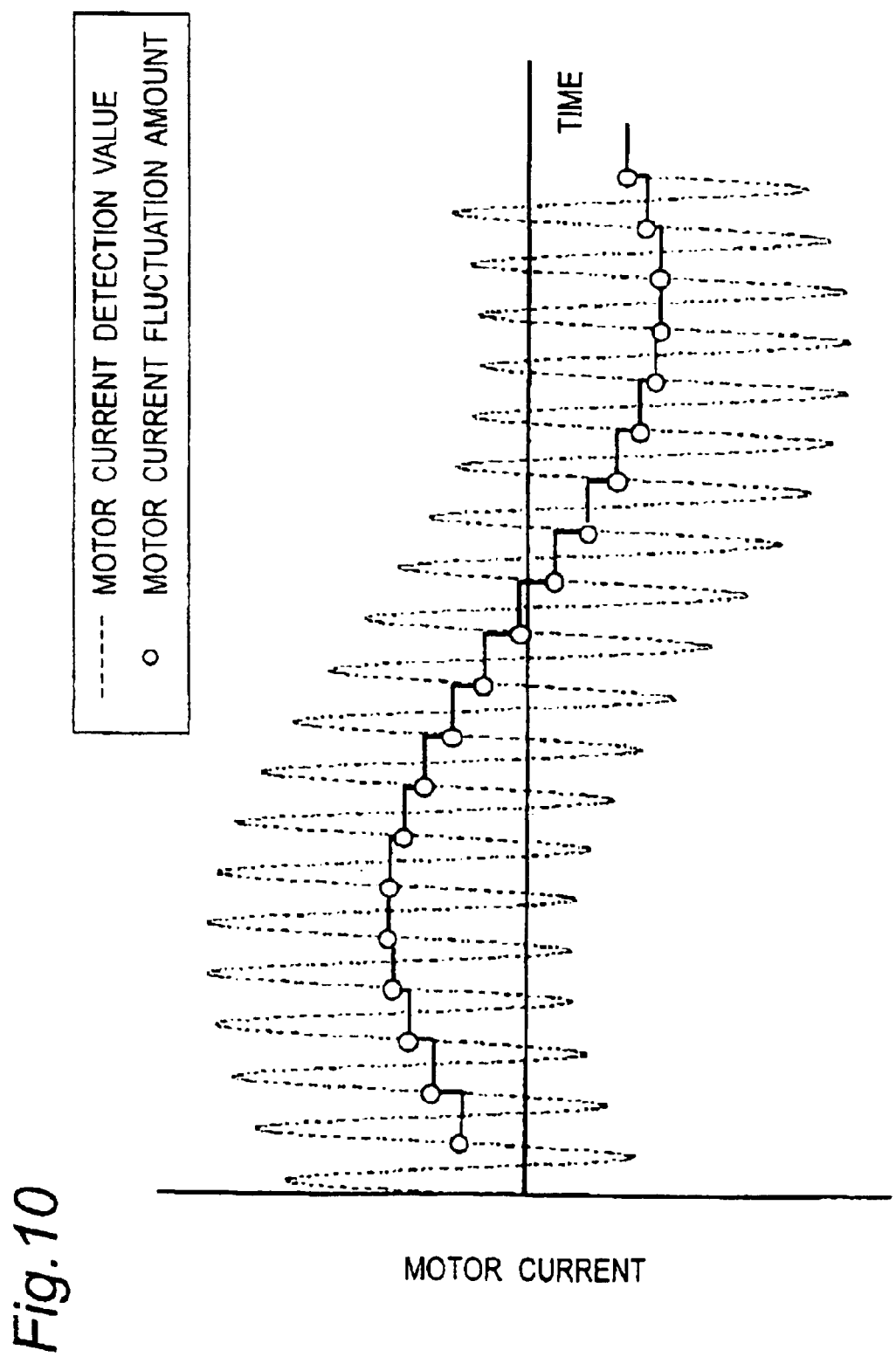
FIG. 10 is an explanatory view showing an operation of the beat amount corrector shown in FIG. 4.

FIG. 10 shows a relation between the motor current detection value $i_j$ and the motor current fluctuation amount $\Delta i_j$ in the beat amount corrector 16 shown in FIG. 4. Referring to FIG. 10, marks ○ designate the motor current average values $i_{j\_mean}$ provided through the calculation, and in a period of calculating the motor current average value $i_{j\_mean}$, the motor current average value $i_{j\_mean}$ in a period of at least (M-1) cycles previous to the present calculation is set as the motor current fluctuation amount $\Delta i_j$, and when the period of calculating the motor current detection values is finished, the motor current fluctuation amount $\Delta i_j$ is updated.

Figure 15:
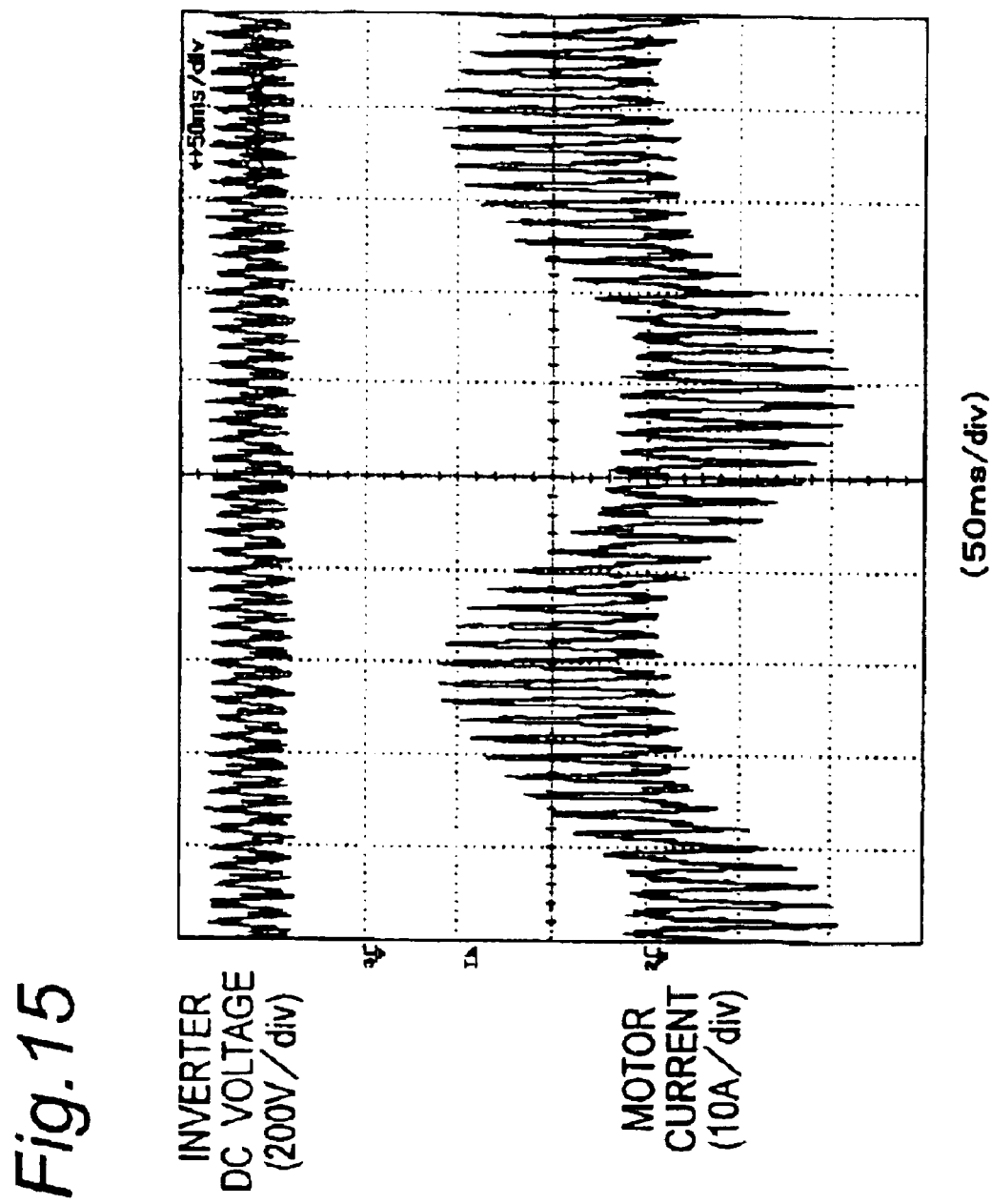
FIG. 15 is a view showing results of a first operation of an inverter controller according to the present invention.
Figure 16:
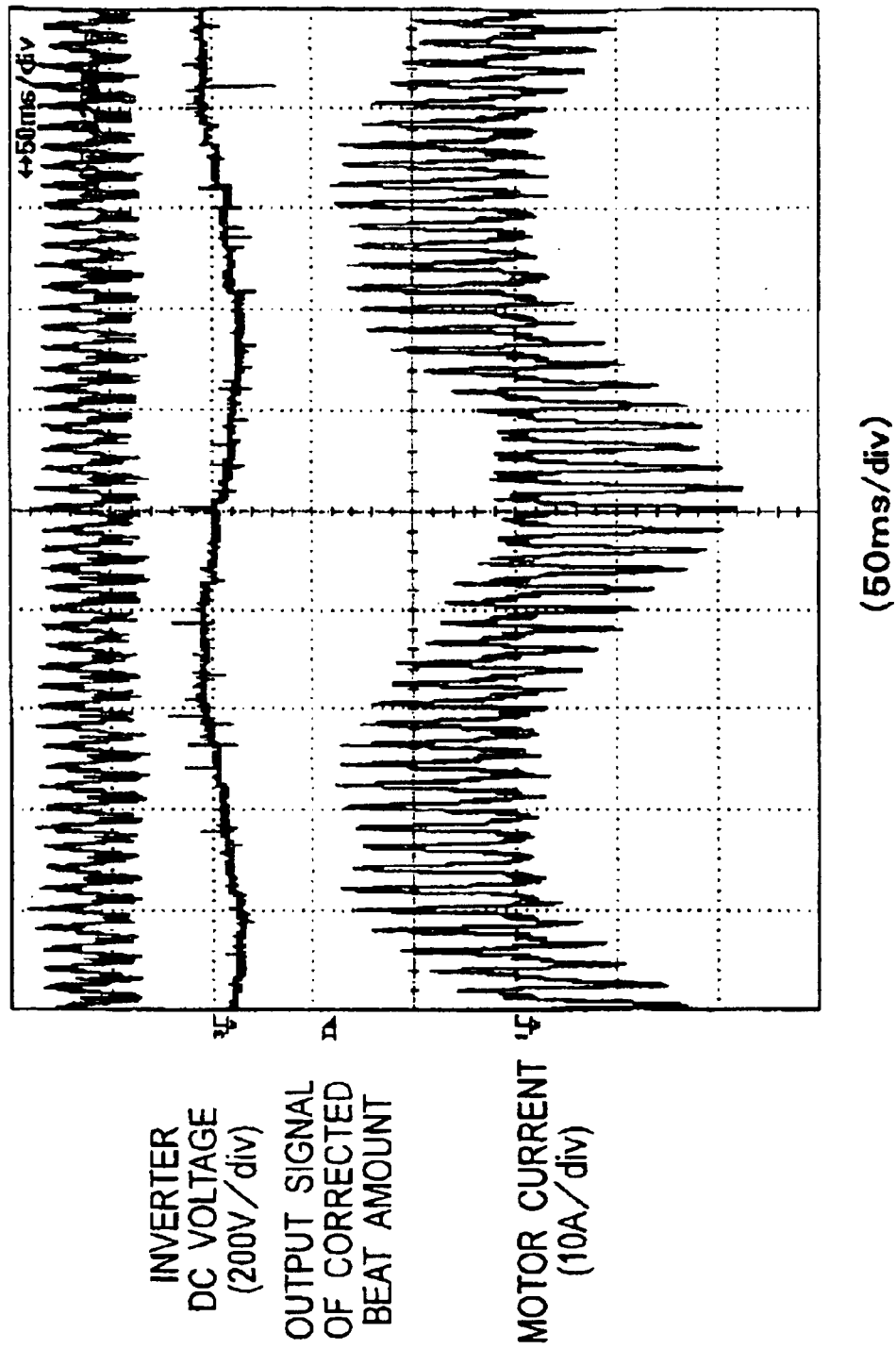
FIG. 16 is a view showing results of a second operation of an inverter controller according to the present invention.

FIGS. 15 and 16 show results when the inverter controller for driving the induction motor of the present invention is operated, where FIG. 15 is an operation result when the motor current fluctuation amount $\Delta i_j$ is not suppressed, and FIG. 16 is an operation result when the motor current fluctuation amount $\Delta i_j$ is suppressed (i.e., when the motor current average value $i_{j\_mean}$ in a period of at least (M-1) cycles before is set as the motor current fluctuation amount $\Delta i_j$ in a period of calculating the motor current average value $i_{j\_mean}$). As compared with FIG. 15, it is seen that the motor current fluctuation amount $\Delta i_j$ of the motor current is reduced in FIG. 16.

In this operation, an AC power supply is 220 V (AC power supply frequency is 50 Hz), an inductance value of a small-capacity reactor is 0.5 mH, capacity of a small-capacity capacitor is 10 μF and the inverter operation frequency is 96 Hz.

As described above, since the average value of the motor current detection values is provided every cycle of the operation frequency of the inverter, a calculation amount in the calculating means such as a microcomputer or memories can be reduced and the cost of the calculating means can be reduced.

Embodiment 3

Figure 5:
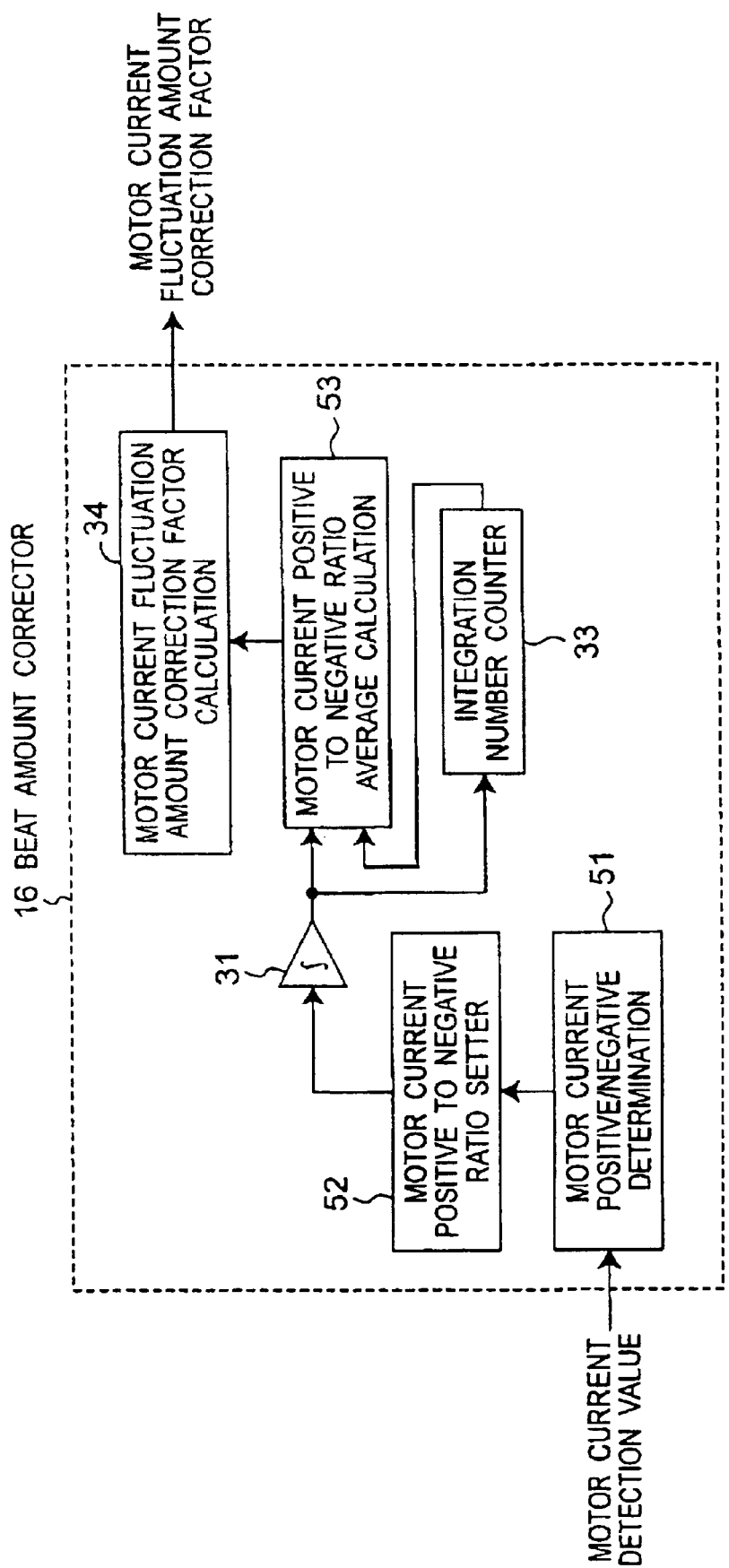
FIG. 5 is a block diagram showing a beat amount corrector according to a third embodiment of the present invention.

FIG. 5 shows a block constitution of a beat amount corrector 16 according to a third embodiment of the present invention. Referring to FIG. 5, a motor current positive/ negative determining portion 51 determines a positive or negative of a motor current detection value $i_j$. A motor current positive to negative ratio setting portion 52 sets a motor current positive to negative ratio $\epsilon_j$ based on an output value of the motor current positive/negative determining portion 51. When the motor current positive to negative ratio $\epsilon_j$ is integrated by an integrator 31, the integration number N of the motor current positive to negative ratio $\epsilon_j$ in one cycle is stored in an integration number counter 33. A motor current positive to negative ratio average calculating portion 53 calculates a motor current positive to negative ratio average value $\epsilon_{j\_mean}$ by dividing an output value of the integrator 31 (an integration value of the motor current positive to negative ratio $\epsilon_j$) by the integration number N stored in the integration number counter 33.

Here, the motor current positive to negative ratio $\epsilon_j$ is set as expressed by a formula (11).
(Formula 11)

$$\varepsilon_j = \begin{cases} 100\% & (i_j \geq 0) \\ 0\% & (i_j < 0) \end{cases} \quad (11)$$

In addition, the motor current positive to negative ratio average value $\epsilon_{j\_mean}$ is expressed by a formula (12).
(Formula 12)

$$\varepsilon_{j\_mean}[nT_S] = \frac{1}{N} \cdot \sum_{m=n-N+1}^{n} \varepsilon_j[mT_S] \quad (12)$$

That is, according to the formula (12), the present value $\epsilon_{j\_mean}[nT_s]$ of the motor current positive to negative ratio average value is provided by the following calculations: integrating the values from the motor current positive to negative ratio $\epsilon_j$ [(n-N+1)T$_s$] which has been provided (N-1) times before, to the present motor current positive to negative ratio $\epsilon_j$ [nT$_s$] and then dividing the integrated value by the integration number N.

In addition, a reverse phase component of the motor current positive to negative ratio average value $i_{j\_mean}$ is obtained by a motor current fluctuation amount correction factor calculating portion 34, and then a beat amount correction factor $k_{bj}$ of each phase is obtained by a calculation as expressed by a formula (13).
(Formula 13)

$$k_{bj} = 1 - \frac{\varepsilon_{j\_mean}}{100} \cdot K_B \quad (13)$$

Here, $K_B$ is a control gain.

Figure 11:
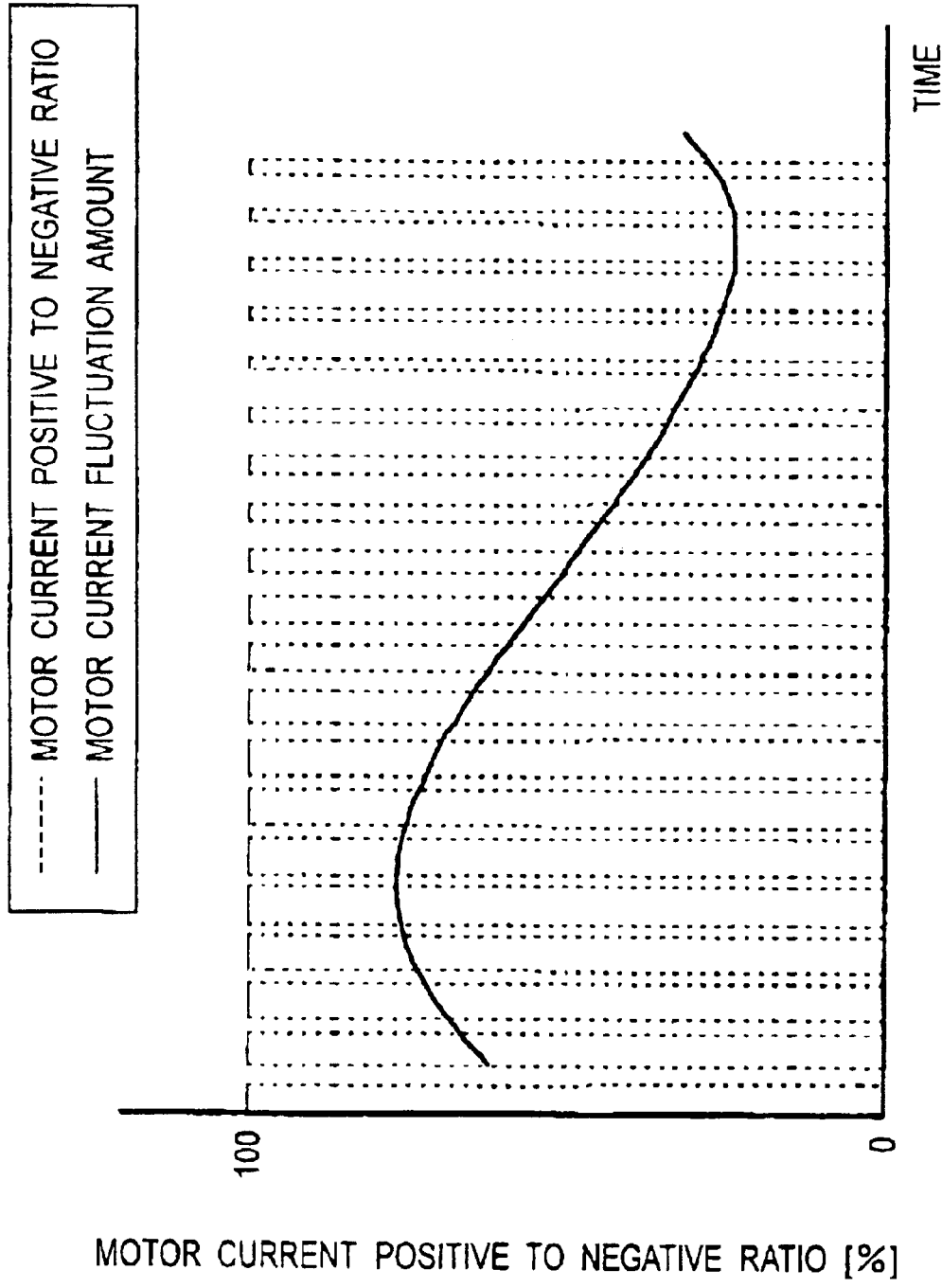
FIG. 11 is an explanatory view showing an operation of the beat amount corrector shown in FIG. 5.

FIG. 11 shows a relation between the motor current positive to negative ratio $\epsilon_j$ and the motor current fluctuation amount $\Delta i_j$ in the beat amount corrector 16 shown in FIG. 5. In FIG. 11, it can be seen that the motor current fluctuation amount $\Delta i_j$ is obtained by calculating the motor current positive to negative ratio average value $i_{j\_mean}$ by the formula (12) in relation to the motor current positive to negative ratio $\epsilon_j$.

As described above, as compared with the case in which the motor current detection values are directly averaged, a calculation amount in calculating means such as a microcomputer, or memories can be reduced and the cost of the calculating means can be reduced.

Embodiment 4

Figure 6:
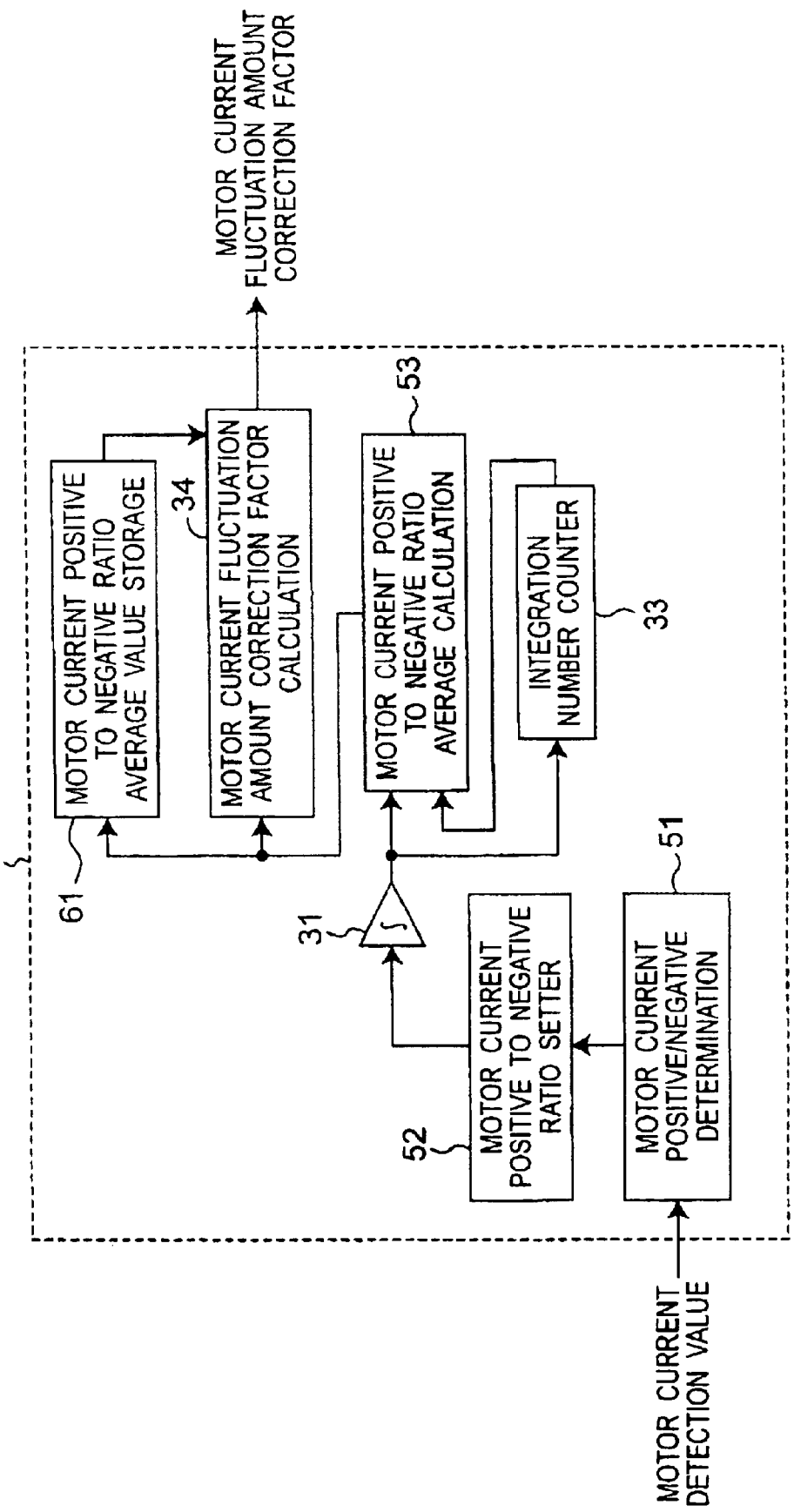
FIG. 6 is a block diagram showing a beat amount corrector according to a fourth embodiment of the present invention.

FIG. 6 shows a block constitution of a beat amount corrector 16 according to a fourth embodiment of the present invention. The same components as in the beat amount corrector in FIG. 5 are allotted to the same reference signs and their descriptions are omitted, and only different parts are described hereinafter.

Referring to FIG. 6, a motor current positive to negative ratio average calculating portion 53 calculates a motor current positive to negative ratio average value $\epsilon_{j\_mean}$ every cycle of an inverter operation frequency $f_1$, and a motor current positive to negative ratio average value storing portion 61 stores the motor current positive to negative ratio average values $\epsilon_{j\_mean}$ in a period of M cycles before the present operation previously provided by the motor current positive to negative ratio average calculating portion 53. In a period of calculating the motor current positive to negative ratio average value $\epsilon_{j\_mean}$, the motor current positive to negative ratio average value $\epsilon_{j\_mean}$ in the (M-1) cycles at least one cycle before is set as the motor current fluctuation amount $\Delta i_j$, and when the period of calculating the motor current positive to negative ratio average values $\epsilon_{j\_mean}$ is finished, the motor current fluctuation amount $\Delta i_j$ is updated.

In this constitution, regarding the number M of the cycles when storing the motor current positive to negative ratio average values $\epsilon_{j\_mean}$ stored in the motor current positive to negative ratio average value storing portion 61, it has been previously set depending on the inverter operation frequency $f_1$ or the loading condition in view of a delay time and response ability.

Figure 12:
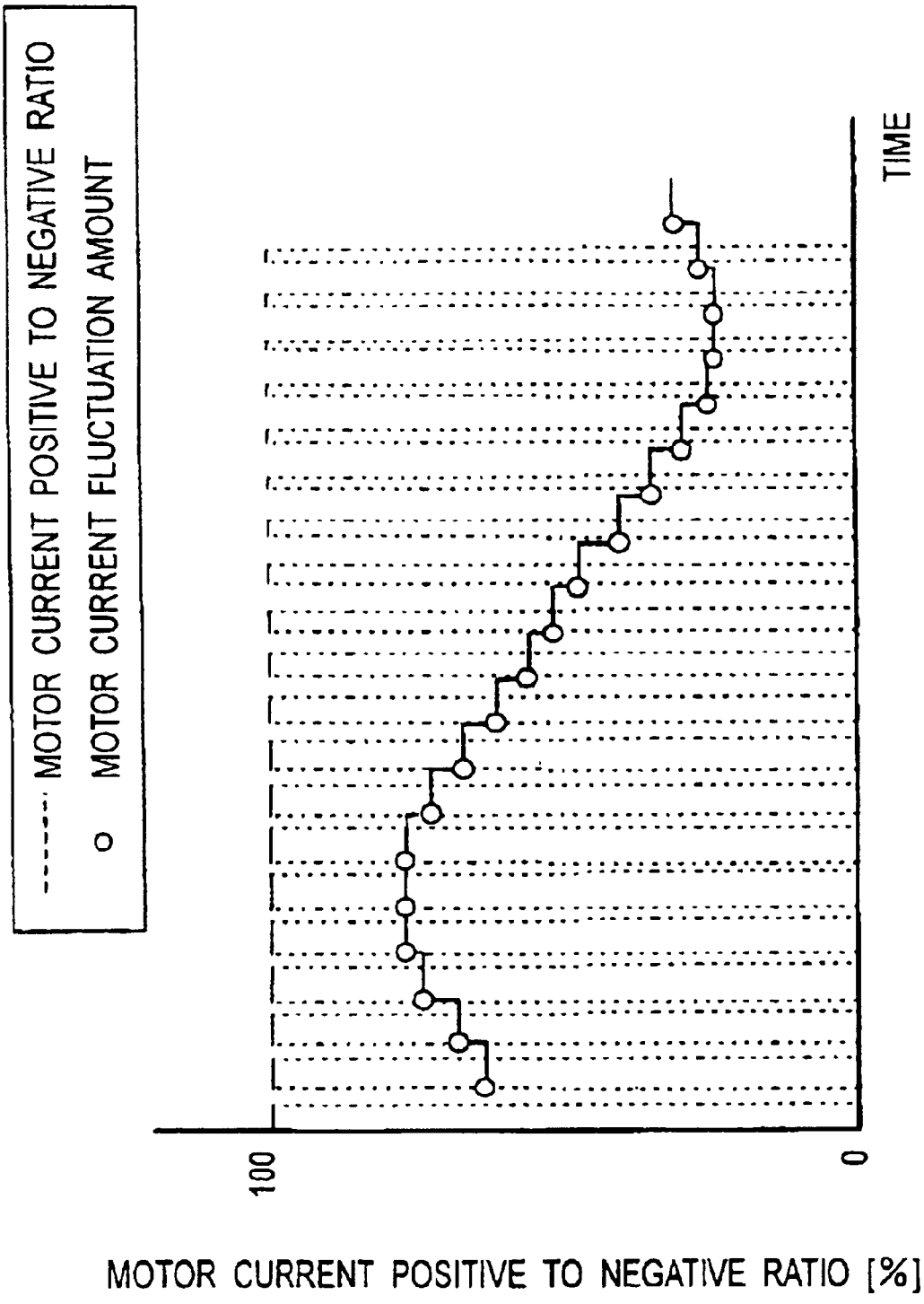
FIG. 12 is an explanatory view showing an operation of the beat amount corrector shown in FIG. 6.

FIG. 12 shows a relation between the motor current positive to negative ratio $\epsilon_j$ and the motor current fluctuation amount $\Delta i_j$ in the beat amount corrector 16 shown in FIG. 6. Referring to FIG. 12, marks ○ designate the motor current positive to negative ratio average values $\epsilon_{j\_mean}$ provided through the calculation, and in a period of calculating the motor current positive to negative ratio average value $\epsilon_{j\_mean}$, the motor current positive to negative ratio average $\epsilon_{j\_mean}$ in the (M-1) cycles at least one cycle before is set as the motor current fluctuation amount $\Delta i_j$, and when the period of calculating the motor current positive to negative ratio average values $\epsilon_{j\_mean}$ is finished, the motor current fluctuation amount $\Delta i_j$ is updated.

As described above, since the average value of the positive to negative ratios is obtained every cycle of the inverter operation frequency, as compared with the case in which the average value of the motor current detection values is provided every cycle of the inverter operation frequency, a calculation amount in the calculating means such as a microcomputer and memories can be further reduced, and the cost of the calculating means can be reduced.

Embodiment 5

A specific method of implementing a beat amount corrector means according to a fifth embodiment of the present invention is described hereinafter.

A motor current fluctuation amount $\Delta i_j$ is obtained by a first-order delay calculation of the motor current detection value $i_j$ where a motor current fluctuation amount a is expressed by a formula (14).
(Formula 14)

$$\Delta i_j = \frac{K_P}{1 + TP} \cdot i_j \quad (14)$$

Here, Kp is a proportional gain, T is a time constant of the first-order delay calculation and P is a differential operator.

As described above, an operation amount in the operating means such as a microcomputer and memories can be reduced and the cost of the calculating means can be further reduced as compared with the case in which the average of the motor current detection values is calculated.

In addition, when an inverter operation frequency fi is smaller than a cutoff frequency $f_{cut-off}$ in the first-order delay calculation, a motor current detection value $i_j$ itself is outputted instead of the motor current fluctuation amount $\Delta i_j$ by the formula (14). Since the motor current fluctuation amount $\Delta i_j$ is not provided, the motor current fluctuation amount $\Delta i_j$ is suppressed only when the inverter operation frequency $f_1$ is larger than the cutoff frequency $f_{cut-off}$.

Here, there is a relation between the cutoff frequency $f_{cut-off}$ and the time constant T as expressed by a formula (15).

(Formula 15)

$$f_{CUT-OFF} = 1/2\pi T \tag{15}$$

As described above, an unstable phenomenon such as hunting of a motor current of an induction motor can be avoided.

In addition, when the above time constant T is large, the time delay associated with the first-order delay calculation is increased, and therefore the motor current fluctuation amount obtained by the first-order delay calculation is largely delayed as compared with the actual motor current fluctuation amount, which reduces the suppression effect of the motor fluctuation. Therefore, in the present embodiment, there is provided a delay time compensating portion for compensating the time delay accompanied with the first-order delay calculation.

As described above, since the delay time accompanied with the first-order delay calculation can be compensated, the suppression effect of the motor current fluctuation amount can be improved Embodiment 6

Figure 7:
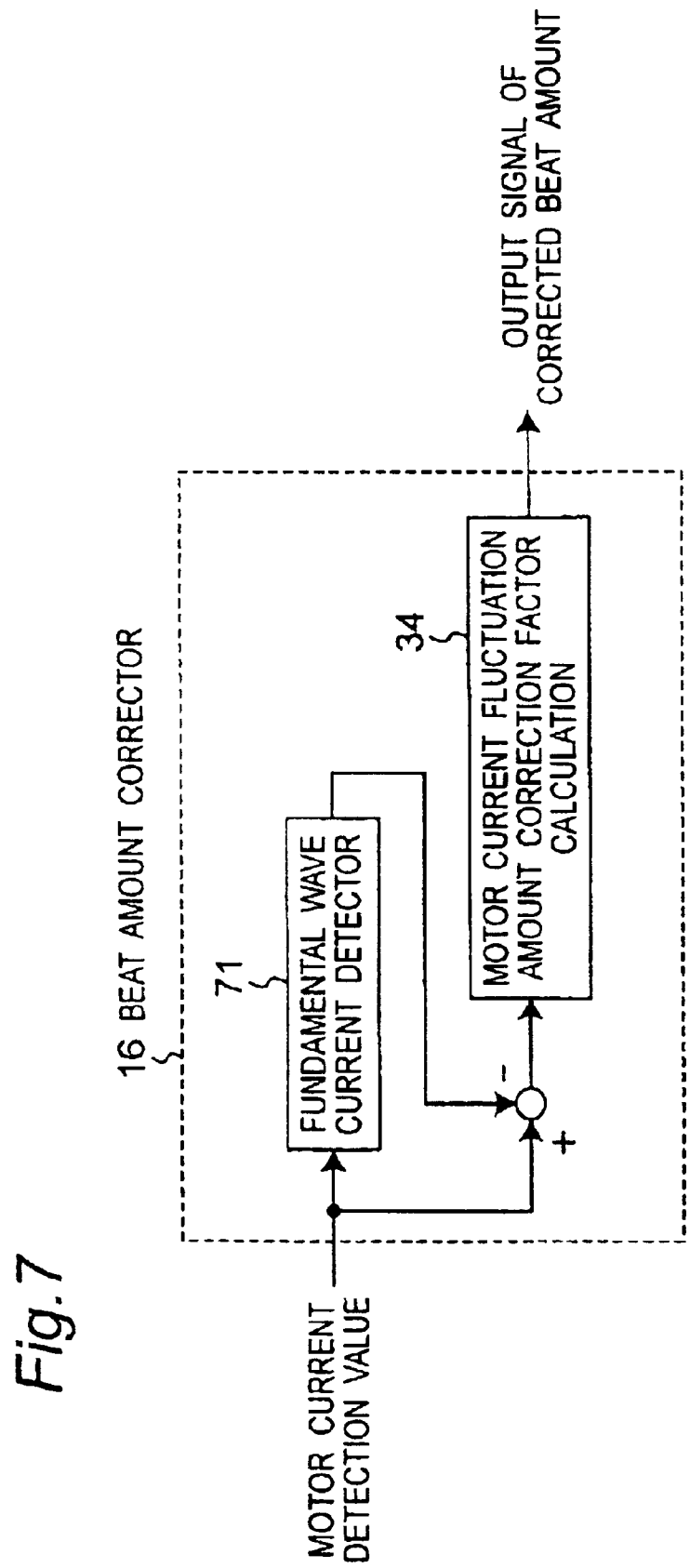
FIG. 7 is a block diagram showing a beat amount corrector according to a sixth embodiment of the present invention.

FIG. 7 shows a block constitution of a beat amount corrector 16 according to a sixth embodiment of the present invention. Referring to FIG. 7, a fundamental wave current detector 71 is provided for detecting a motor current fundamental wave component $i_{1j}$ from a motor current detection value $i_j$, so that a motor current fluctuation amount $\Delta i_j$ is obtained by a difference between the motor current detection value $i_j$ and an output value $i_{1j}$ of the fundamental wave current detector 71.

Here, as described in the formula (6) of the first embodiment, the motor current detection value $i_j$ can be generally provided by combining the fundamental wave component $i_{1j}$ and a fluctuation amount $\Delta i_j$.

Therefore, by detecting the motor current fundamental wave component $i_{1j}$ from the motor current detection value $i_j$, the motor current fluctuation amount $\Delta i_j$ can be obtained from a difference between the motor current detection value $i_j$ and the motor current fundamental wave component $i_{1j}$ as expressed by a formula (16).

(Formula 16)

$$\Delta i_j = i_j - i_{1j} \tag{16}$$

As described above, an operation amount of the operating means such as a microcomputer and memories can be reduced and the cost of the calculating means can be further reduced as compared with the case in which the first-order delay calculation is performed for the motor current detection value.

Figure 8:
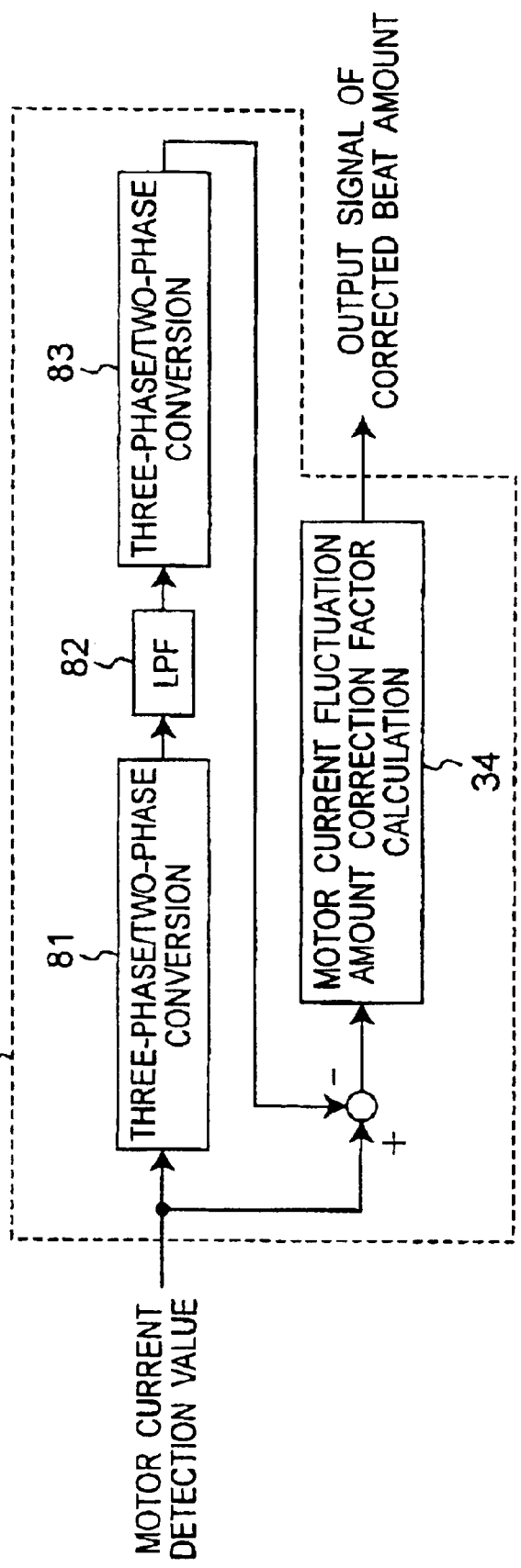
FIG. 8 is a block diagram showing a fundamental wave current detector in the beat amount corrector in FIG. 7 according to the first embodiment of the present invention.

FIG. 8 shows an example of a block constitution of the fundamental wave current detecting means 71 shown in FIG. 7.

Referring to FIG. 8, the motor current detection value $i_j$ is converted from a three-phase AC to a two-phase DC by a three-phase/two-phase converter 81, and an output value of the three-shape/two-phase converter 81 is obtained as two-phase DC current containing a ripple because of the motor current fluctuation amount $\Delta i_j$, which becomes a perfect DC component through a LPF 82. The output value of the LPF 82 (i.e., perfect DC component) is converted from the two-phase DC to a three-phase AC by a two-phase/three-phase converter 83, so that the motor current fundamental wave component $i_{1j}$ is detected.

Here, in the three-phase/two-phase converter 81, the motor current detection value $i_j$ is converted from the three-phase AC to the two-phase DC $i\gamma$ and $i\delta$ by a formula (17).

(Formula 17)

$$\begin{bmatrix} i_\gamma \\ i_\delta \end{bmatrix} = \sqrt{\frac{2}{3}} \begin{bmatrix} \sin\theta_1 & \sin(\theta_1 - 2\pi/3) & \sin(\theta_1 + 2\pi/3) \\ \cos\theta_1 & \cos(\theta_1 - 2\pi/3) & \cos(\theta_1 + 2\pi/3) \end{bmatrix} \begin{bmatrix} i_u \\ i_v \\ i_w \end{bmatrix} \tag{17}$$

In addition, in the LPF 82, the perfect DC components $i\gamma_0$ and $i\delta_0$ are only obtained from the two-phase DC $i\gamma$ and $i\delta$ by a calculation of a formula (18).

(Formula 18)

$$\begin{bmatrix} i_{\gamma 0} \\ i_{\delta 0} \end{bmatrix} = \frac{K_{LPF}}{1 + T_{LPF}P} \begin{bmatrix} i_\gamma \\ i_\delta \end{bmatrix} \tag{18}$$

Here, $K_{LPF}$ is a proportional gain, $T_{LPF}$ is a time constant, and P is a differential operator.

Furthermore, in the two-phase/three-phase converter 83, the two-phase current $i\gamma_0$ and $i\delta_0$ which are the perfect DC components are converted to the three-phase AC by a calculation of a formula (19).

(Formula 19)

$$\begin{bmatrix} i_{1u} \\ i_{1v} \\ i_{1w} \end{bmatrix} = \sqrt{\frac{2}{3}} \begin{bmatrix} \sin\theta_1 & \cos\theta_1 \\ \sin(\theta_1 - 2\pi/3) & \cos(\theta_1 - 2\pi/3) \\ \sin(\theta_1 + 2\pi/3) & \cos(\theta_1 + 2\pi/3) \end{bmatrix} \begin{bmatrix} i_{\gamma 0} \\ i_{\delta 0} \end{bmatrix} \tag{19}$$

In addition, in a motor current fluctuation amount correction factor calculating portion 34, a reverse phase component of the motor current fluctuation amount $\Delta i_j$ calculated by the formula (16) is obtained, and a beat amount correction factor $k_{bj}$ of each phase is calculated by a formula (20).

(Formula 20)

$$k_{bj} = 1 - \frac{\Delta i_j}{I_R} \cdot K_B \tag{20}$$

Here, $I_R$ is a predetermined motor current reference value and $K_B$ is a control gain.

Figure 13:
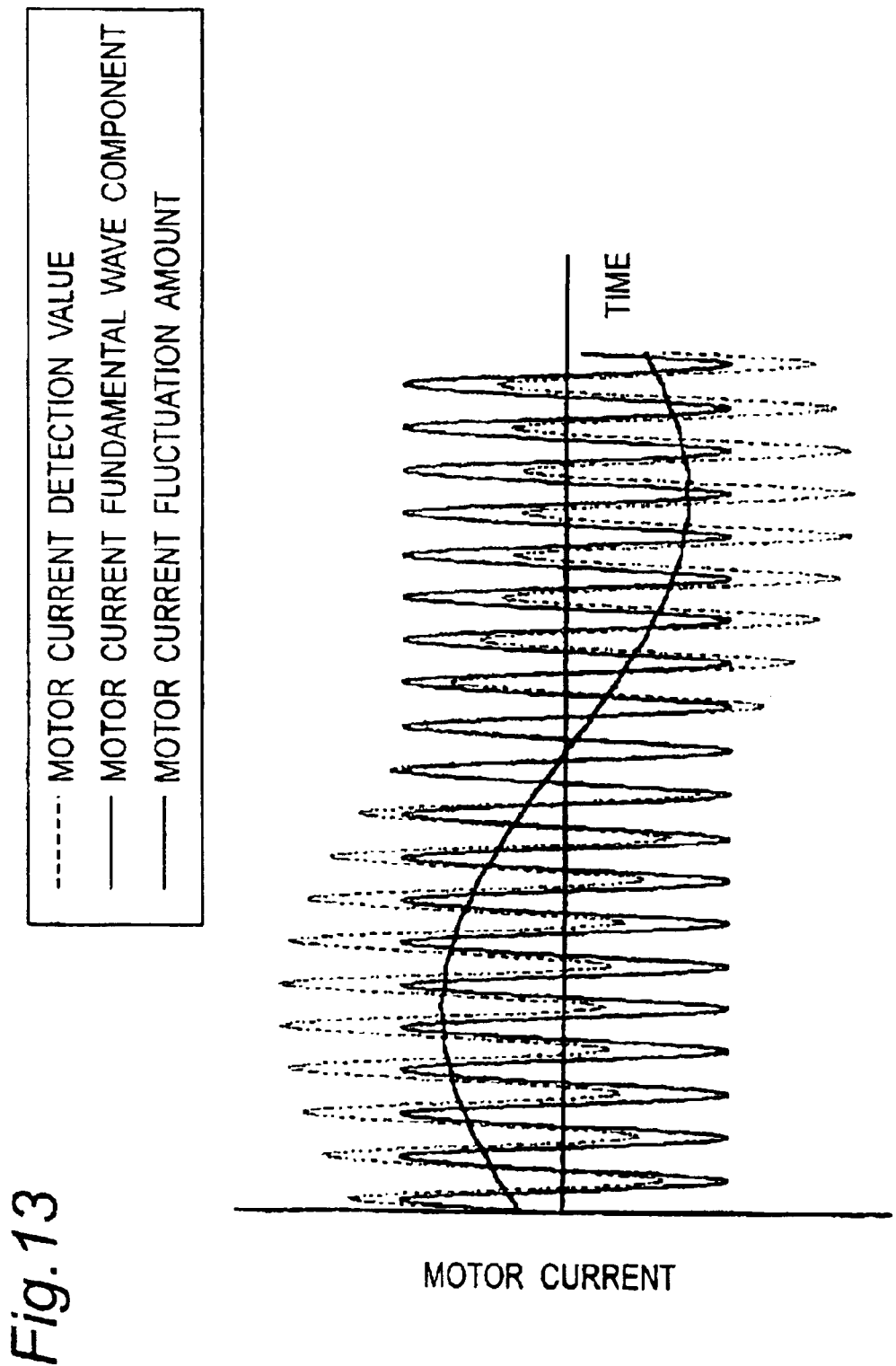
FIG. 13 is an explanatory view showing a first operation of the beat amount corrector shown in FIG. 7.
Figure 14:
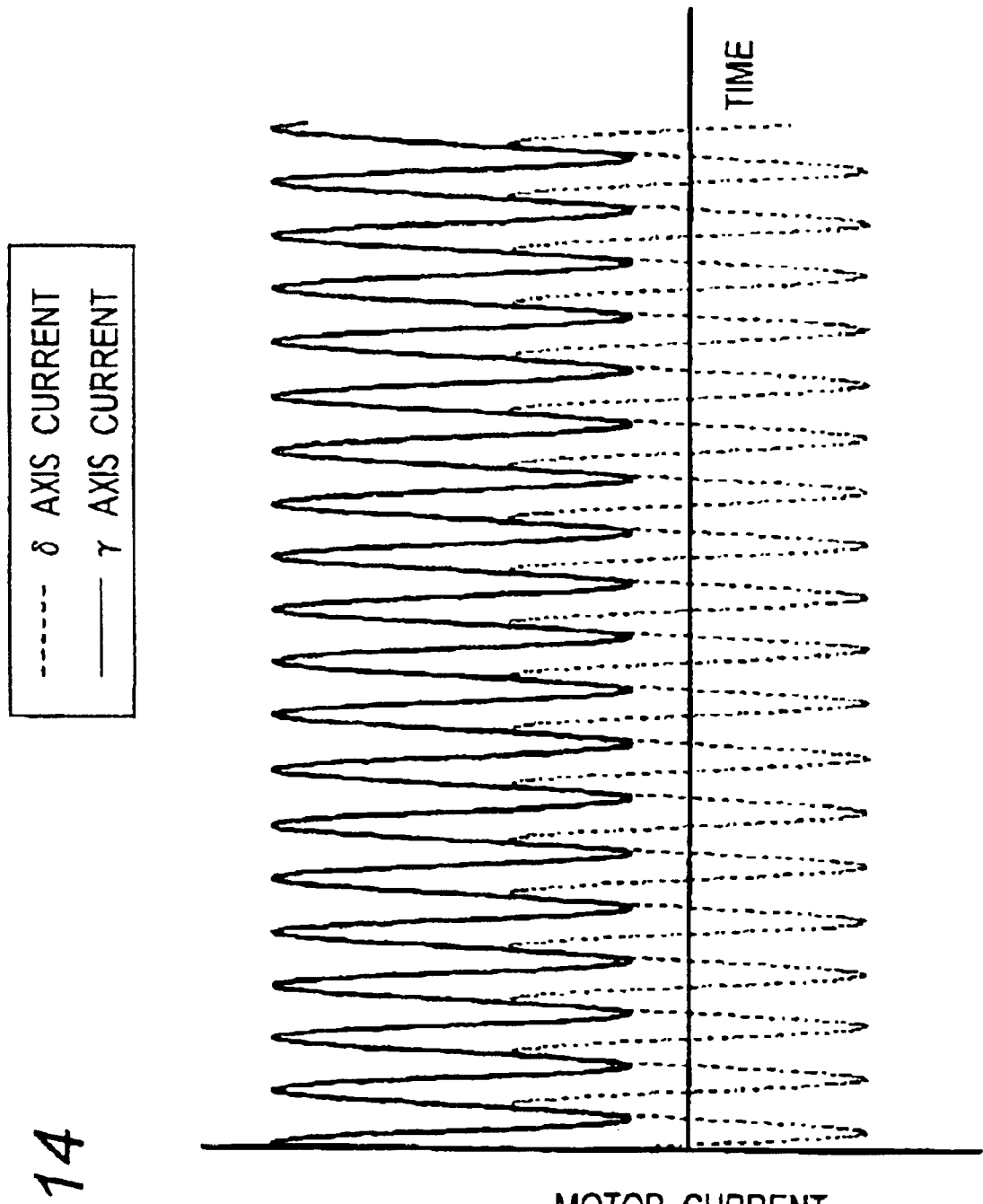
FIG. 14 is an explanatory view showing a second operation of the beat amount corrector shown in FIG. 7.

FIGS. 13 and 14 show operation explanatory views of the beat amount corrector 16 shown in FIG. 8. FIG. 13 shows a relation between the motor current detection value $i_j$, the motor current fundamental wave component $i_{1j}$ and the motor current fluctuation amount $\Delta i_j$. FIG. 14 shows the two-phase DC $i\gamma$ and $i\delta$ which are the output values of the three-phase/two-phase converter 81.

Here, the two-phase DC $i\gamma$ and $i\delta$ shown in FIG. 14 are obtained by calculating the motor current detection value $i_j$ shown in FIG. 13 by the formula (17), and the two-phase DC $i\gamma_0$ and $i\delta_0$ which are the perfect DC components are obtained from the two-phase DC $i\gamma$ and $i\delta$ through the LPF 82. Then, the motor current fundamental wave component $i_{1j}$ shown in FIG. 13 is obtained by calculating the two-phase DC $i\gamma_0$ and $i\delta_0$ by the formula (19). In addition, the motor current fluctuation amount $\Delta i_j$ can be obtained by a differential calculation of the formula (16).

It is noted here that, regarding the delay time and response ability by the LPF 82, since the calculation of the formula (18) is performed in the two-phase DC, the delay time is less affected by the LPF 82 when the motor current fundamental wave component $i_{1j}$ is actually obtained.

As described above, since the first-order delay calculation is performed after the motor current detection value is converted from the three-phase AC to the two-phase DC, the motor current fluctuation amount can be obtained at a real time without a time delay. Thus, the suppression effect of the motor current fluctuation amount can be improved.

Embodiment 7

The following description is made of a specific method regarding a condition in suppressing the motor current fluctuation amount of the beat amount corrector according to the present invention.

When a motor current fluctuation amount $\Delta i_j$ is smaller than a predetermined set value $\Delta i_R$ of the motor current fluctuation amount, since an affect of the motor current fluctuation amount $\Delta i_j$ is small, the motor current fluctuation amount $\Delta i_j$ is not suppressed. Instead, only when the motor current fluctuation amount $\Delta i_j$ is larger than the predetermined set value $\Delta i_R$ of the motor current fluctuation amount, the motor current fluctuation amount $\Delta i_j$ is suppressed.

As described above, only when the motor current fluctuation amount is larger than the predetermined set value of the motor current fluctuation amount, the motor current fluctuation amount is suppressed. Thus, the motor current fluctuation amount can be effectively suppressed, and furthermore, an operation amount by the operating means such as a microcomputer and memories can be reduced and the cost of the calculating means can be further reduced.

In addition, only when an inverter operation frequency $f_1$ is larger than a predetermined inverter operation frequency set value $f_{1R}$, the motor current fluctuation amount $\Delta i_j$ is suppressed.

As described above, only when the inverter operation frequency is larger than the predetermined inverter operation frequency set value, the motor current fluctuation amount is suppressed, so that the motor current fluctuation amount can be effectively suppressed, and furthermore, the operation amount by the operating means such as a microcomputer and memories can be reduced and the cost of the calculating means can be further reduced.

Still further, under a transient condition in which an induction motor is accelerated or decelerated, the motor current fluctuation amount $\Delta i_j$ is not suppressed.

As described above, under the transient condition in which the induction motor is accelerated or decelerated, the motor current fluctuation amount is not suppressed, and therefore an unstable phenomenon such as hunting of a motor current of the induction motor can be avoided. Furthermore, the operation amount by the operating means such as a microcomputer and memories can be reduced and the cost of the calculating means can be reduced.

Embodiment 8

A specific method of implementing the motor current detecting means according to the first embodiment of the present invention will be described below.

The motor current detecting means is implemented by providing a current detector detecting a current flowing in a bus line of an inverter. In this construction, a shunt resistance previously provided in the bus line of the inverter for protecting the inverter from an overcurrent also serves as the current detector, and a motor current is detected from an output value of the current detector in synchronization with a carrier frequency.

Figure 17:
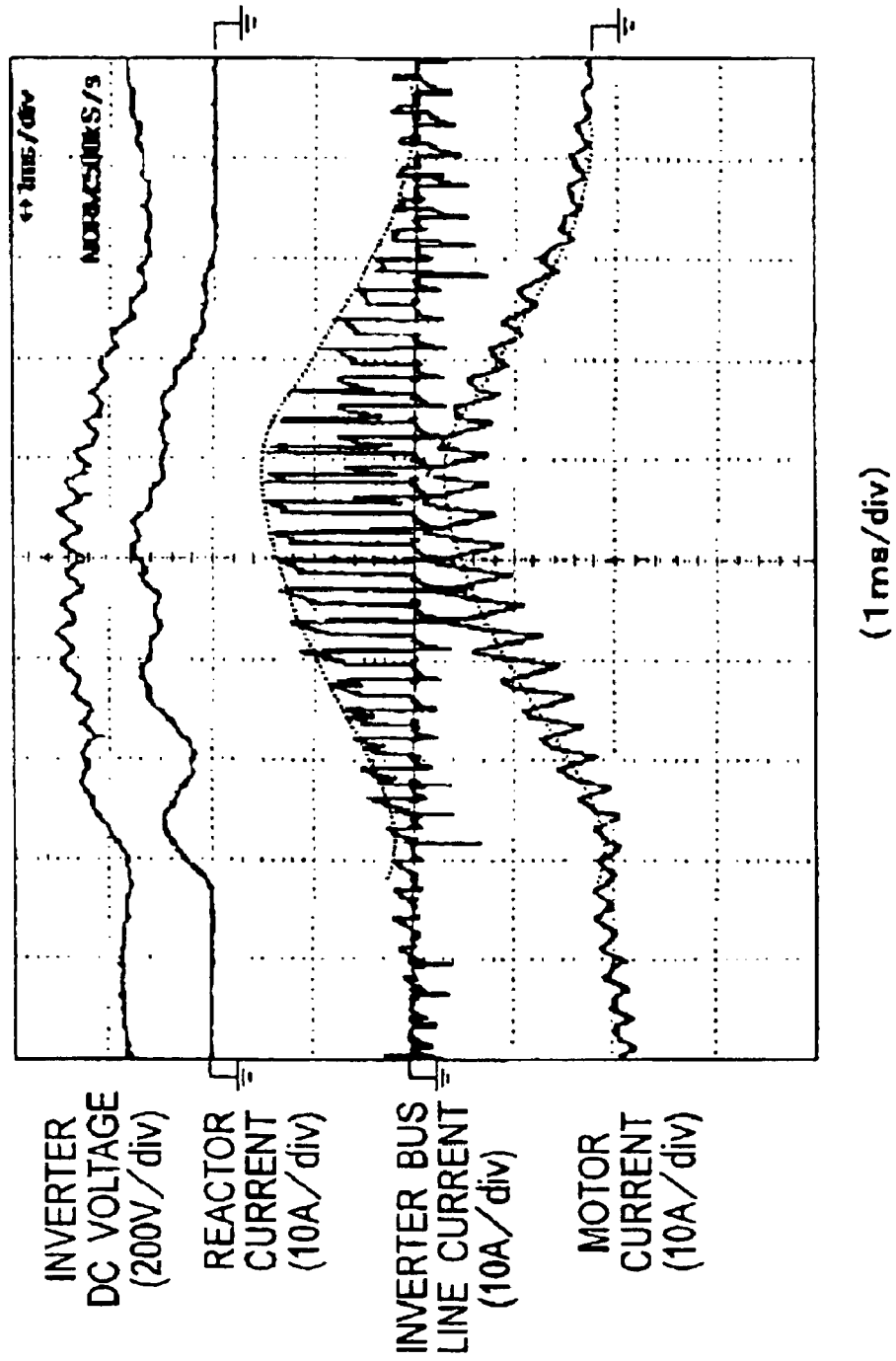
FIG. 17 is an explanatory view showing a first operation of a motor current detector according to the present invention.

FIG. 17 shows a first operation explanatory view of the current detecting means of the present invention. Referring to FIG. 17, since an inverter bus line current is not a continuous value in a time axis (lateral axis) like the motor current, and it is discrete value every carrier frequency of the inverter. That is, since a positive current flows in the inverter when the inverter is energized, it varies like a pulse as shown in FIG. 17. Therefore, it is necessary to detect the inverter bus current in synchronization with the carrier frequency, in the inverter bus current detector 13 which is implemented by the shunt resistance previously provided in order to protect the inverter from overcurrent thereof. provided in order to protect the inverter from overcurrent thereof.

In this method, as shown by broken lines in FIG. 17, since a peak value (a maximum value in each pulse waveform) of the inverter bus current basically coincides with the motor current, the motor current can be detected by detecting the peak value of the pulse waveform of the inverter bus line current.

In addition, when the current is detected without synchronizing with the carrier frequency, the current may be detected when the inverter is not energized, and therefore it is difficult to detect the motor current.

In this example shown in FIG. 17, an AC power supply is 220 V (AC power supply frequency is 50 Hz), an inductance value of the small-capacity reactor is 2 mH, capacity of the small-capacity capacitor is 25 µF, an inverter operation frequency is 40 Hz and the inverter carrier frequency is 3.3 kHz.

Here, as compared to the motor current for only one phase depicted by the discrete value shown in FIG. 17, the motor currents for three phases can be continuously detected by using at least two current detectors such as the motor current detectors 14a and 14b as shown in FIG. 1.

Figure 18:
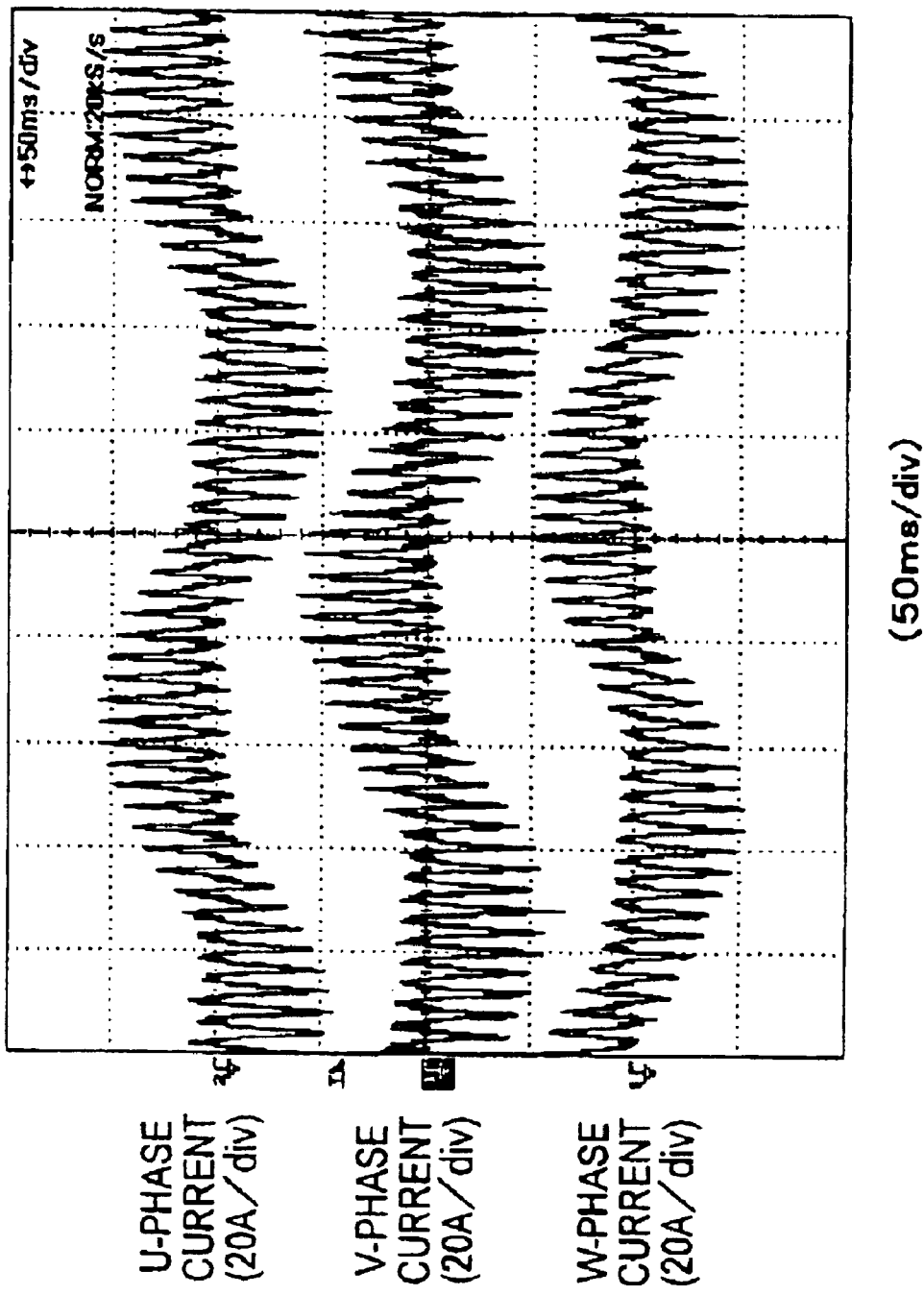
FIG. 18 is an explanatory view showing a second operation of the motor current detector according to the present invention.

However, as shown in FIG. 18 showing a second operation explanatory view of the current detecting means according to the present invention, since the motor current fluctuation amount in the motor current of each phase has a time difference (in lateral axis) but has the same size and frequency, the motor current fluctuation amount of, for example, U phase is obtained from the motor current detection value of the U phase by means of the beat amount corrector. Regarding the motor current fluctuation amount of V phase and W phase, by previously setting a delay time depending on the inverter operation frequency or the loading condition, the motor current fluctuation amount of V phase and W phase can be obtained from the motor current fluctuation amount of U phase.

Furthermore, an applied voltage command value of the induction motor can be provided by calculation of the formula (10), using the motor current fluctuation amount of each phase.

In the example shown in FIG. 18, the AC power supply is 220 V (AC power supply frequency is 50 Hz), the inductance value of the small-capacity reactor is 0.5 mH, the capacity of the small-capacity capacitor is 10 µF, the inverter operation frequency is 96 Hz and the inverter carrier frequency is 5 kHz.

According to the above constitution, the cost of the motor current detecting means can be a requisite minimum as compared with the case in which a current sensor is used.

It is noted that, although the induction motor is described in the above embodiments, the present invention can be applied to another motor.

As described above, according to the present invention, a small, light and low-cost inverter controller for driving the motor can be implemented by using the small-capacity reactor and the small-capacity capacitor. As a result, even when it is difficult or impossible to drive the motor because the inverter DC voltage largely fluctuates, the motor can be kept driving by keeping the voltage applied to the motor constant by the PN voltage correcting means. The small, light and low-cost inverter controller for driving the motor can further be provided by suppressing the fluctuation amount of the motor current by the beat amount amount correcting means to reduce loss and current capacity of the element.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An inverter controller for driving a motor, comprising:
   an AC power supply for supplying an AC power;
   a rectifier formed of a diode bridge for rectifying the AC power to be converted to DC power;
   a reactor having a predetermined small capacity which is connected to the rectifier, for improving a power factor of the AC power supply;
   an inverter which converts the DC power to AC power for driving the motor;
   a capacitor having a predetermined small capacity which is connected between DC bus lines of the inverter to absorb regeneration energy from the motor;
   a motor voltage command generator which generates a motor voltage command value of the motor, based on a speed command value of the motor applied from the outside;
   a positive neutral (PN) voltage detector which detects a DC voltage value of the inverter;
   a PN voltage corrector which calculates a ratio of the DC voltage detection value of the inverter obtained by the PN voltage detector to a predetermined DC voltage reference value of the inverter to thereby generate a PN voltage correction factor;
   a first motor voltage command corrector which performs voltage correction of the motor voltage command value by multiplying the motor voltage command value obtained by the motor voltage command generator by the PN voltage correction factor which is an output value of the PN voltage corrector to thereby produce a motor voltage command correction value;
   a motor current detector which detects a motor current of the motor;
   a beat amount corrector which calculates a fluctuation amount of the motor current from the motor current detection value obtained by the motor current detector and generates a reverse phase component of the motor current fluctuation amount; and
   a second motor voltage command corrector which performs voltage correction of the motor voltage command correction value by multiplying the motor voltage command correction value obtained by the first motor voltage command corrector, by an output value of the beat amount corrector, and generates a voltage command value to be applied to the motor.

2. The inverter controller according to claim 1, wherein the beat amount corrector calculates the motor current fluctuation amount ($\Delta i_j$) by calculating an average ($i_{j\_mean}$) of the motor current detection values.

3. The inverter controller according to claim 1,
   wherein the beat amount corrector calculates an average value of the motor current detection values every cycle of an inverter operation frequency ($f_1$),
   wherein, in a period of calculating the average value of the motor current detection values, the average value of the motor current detection values in a period up to at least one cycle before is set as the motor current fluctuation amount ($\Delta i_j$), and
   wherein, the period of calculating the average values of the motor current detection values is finished, the motor current fluctuation amount is updated.

4. The inverter controller according to claim 1, wherein the beat amount corrector calculates a positive to negative ratio of the motor current detection value and obtains the motor current fluctuation amount by calculating an average of the positive to negative ratios.

5. The inverter controller according to claim 1,
   wherein the beat amount corrector calculates an average value of the positive to negative ratios every cycle of the inverter operation frequency,
   wherein, in a period of calculating the average value of the positive to negative ratios, the average value of the positive to negative ratios in a period up to at least one cycle before is set as the motor current fluctuation amount, and
   wherein, when the period of calculating the average values of the positive to negative ratios is finished, the motor current fluctuation amount is updated.

6. The inverter controller according to claim 1, wherein the beat amount corrector calculates the motor current fluctuation amount by a first-order delay calculation of the motor current detection value.

7. The inverter controller according to claim 6, wherein the beat amount corrector suppresses the motor current fluctuation amount only when the inverter operation frequency is larger than a cutoff frequency in the first-order delay calculation.

8. The inverter controller according to claim 6, wherein the beat amount corrector includes a delay time compensating means for compensating a time delay accompanied by the first-order delay calculation.

9. The inverter controller according to claim 1, wherein the beat amount corrector includes a fundamental wave current detector which detects a fundamental wave component of the motor current from the motor current detection value and calculates the motor current fluctuation amount from a difference between the motor current detection value and an output value of the fundamental wave current detector.

10. The inverter controller according to claim 9, wherein the fundamental wave current detector converts the motor current detection value from a three-phase AC to a two-phase DC, performs a first-order calculation thereof, and further converts the resultant value from the two-phase DC to the three-phase AC, thereby obtaining the motor current fundamental wave component.

11. The inverter controller according to claim 1, wherein the motor current fluctuation amount is suppressed only when the motor current fluctuation amount is larger than a predetermined set value of the motor current fluctuation amount.

12. The inverter controller according to claim 1, wherein the motor current fluctuation amount is suppressed only when an inverter operation frequency is larger than a predetermined inverter operation frequency set value.

13. The inverter controller according to claim 1, wherein the motor current fluctuation amount is not suppressed in a transient condition in which the motor is accelerated or decelerated.

14. The inverter controller according to claim 1, wherein the motor current detector includes a current detector which detects a current flowing on the side of an AC output of the inverter.

15. The inverter controller according to claim 14, wherein the current detector is a current sensor.

16. The inverter controller according to claim 14, wherein the current detector is a shunt resistance.

17. The inverter controller according to claim 14, wherein the motor current detector detects the motor current in synchronization with a carrier frequency of the inverter.

18. The inverter controller according to claim 1, wherein the motor current detector includes a current detector which detects a current flowing in a DC bus line of the inverter so that the motor current is detected from an output value of the current detector.

19. The inverter controller according to claim 18, wherein a shunt resistance previously provided in the DC bus line of the inverter for protecting an overcurrent of the inverter serves as the current detector.

20. An air conditioner which includes a converter apparatus for converting AC power to DC power and an inverter apparatus for converting the DC power converted by the converter to AC power of a variable voltage and a variable frequency and supplying the AC power to a motor for driving a compressor, wherein the inverter apparatus comprises:

an AC power supply for supplying an AC power;

a rectifier formed of a diode bridge for rectifying the AC power to be converted to DC power;

a reactor having a predetermined small capacity which is connected to the rectifier, for improving a power factor of the AC power supply;

an inverter which converts the DC power to AC power for driving the motor;

a capacitor having a predetermined small capacity which is connected between DC bus lines of the inverter to absorb regeneration energy from the motor;

a motor voltage command generator which generates a motor voltage command value of the motor, based on a speed command value of the motor applied from the outside;

a positive neutral (PN) voltage detector which detects a DC voltage value of the inverter;

a PN voltage corrector which calculates a ratio of the DC voltage detection value of the inverter obtained by the PN voltage detector to a predetermined DC voltage reference value of the inverter to thereby generate a PN voltage correction factor;

a first motor voltage command corrector which performs voltage correction of the motor voltage command value by multiplying the motor voltage command value obtained by the motor voltage command generator by the PN voltage correction factor which is an output value of the PN voltage corrector to thereby produce a motor voltage command correction value;

a motor current detector which detects a motor current of the motor;

a beat amount corrector which calculates a fluctuation amount of the motor current from the motor current detection value obtained by the motor current detector and generates a reverse phase component of the motor current fluctuation amount; and a second motor voltage command corrector which performs voltage correction of the motor voltage command correction value by multiplying the motor voltage command correction value obtained by the first motor voltage command corrector, by an output value of the beat amount corrector, and generates a voltage command value to be applied to the motor.

* * * * *

UNITED STATES PATENT AND TRADEMARK OFFICE
CERTIFICATE OF CORRECTION

PATENT NO. : 6,958,589 B2
DATED : October 25, 2005
INVENTOR(S) : Mitsuo Kawaji et al It is certified that error appears in the above-identified patent and that said Letters Patent is hereby corrected as shown below:

Column 20,
Line 58, "first-order calculation" should read -- first-order delay calculation --.

Signed and Sealed this

Twenty-eighth Day of February, 2006

JON W. DUDAS
*Director of the United States Patent and Trademark Office*